(12) United States Patent
Kamamori

(10) Patent No.: US 9,916,043 B2
(45) Date of Patent: Mar. 13, 2018

(54) INFORMATION PROCESSING APPARATUS FOR RECOGNIZING USER OPERATION BASED ON AN IMAGE

(71) Applicant: CANON KABUSHIKI KAISHA, Tokyo (JP)

(72) Inventor: Yuki Kamamori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/164,123

(22) Filed: May 25, 2016

(65) Prior Publication Data

US 2016/0349925 A1    Dec. 1, 2016

(30) Foreign Application Priority Data

May 29, 2015    (JP) .................. 2015-110215

(51) Int. Cl.
*G06F 3/042*    (2006.01)
*G06F 3/0488*    (2013.01)
*G06K 9/00*    (2006.01)
*G06F 3/01*    (2006.01)

(52) U.S. Cl.
CPC .......... *G06F 3/0425* (2013.01); *G06F 3/017* (2013.01); *G06F 3/04883* (2013.01); *G06K 9/00355* (2013.01); *G06F 2203/04806* (2013.01); *G06F 2203/04808* (2013.01)

(58) Field of Classification Search
CPC .... G06F 3/0425; G06F 3/017; G06F 3/04883; G06F 2203/04806; G06F 2203/04808; G06F 3/005; G06K 9/00355

USPC ................................................. 345/175
See application file for complete search history.

(56) References Cited

U.S. PATENT DOCUMENTS

| 2002/0140667 | A1* | 10/2002 | Horiki | G06F 1/1616 |
| | | | | 345/156 |
| 2011/0102570 | A1* | 5/2011 | Wilf | G06F 3/017 |
| | | | | 348/77 |
| 2014/0240225 | A1* | 8/2014 | Eilat | G06F 3/011 |
| | | | | 345/156 |

FOREIGN PATENT DOCUMENTS

JP    2013-205983 A    10/2013

* cited by examiner

*Primary Examiner* — Stephen Sherman
(74) *Attorney, Agent, or Firm* — Canon USA, Inc. I.P. Division

(57) ABSTRACT

An apparatus includes a detection unit configured to detect, from an image obtained by capturing a predetermined object, one or more indicated positions indicated by the predetermined object, an extraction unit configured to extract, from the image, feature information indicating a state of the predetermined object, the feature information being different from the indicated positions, a first recognition unit configured to recognize, based on a change in a positional relationship between two or more of the indicated positions, an operation to be input to the apparatus, a second recognition unit configured to, based on a change in the feature information, recognize an operation to be input to the apparatus, and an output unit configured to output either one of recognition results of the first recognition unit and the second recognition unit, the either one of recognition results being selected based on a shift of a number of the indicated positions.

20 Claims, 12 Drawing Sheets

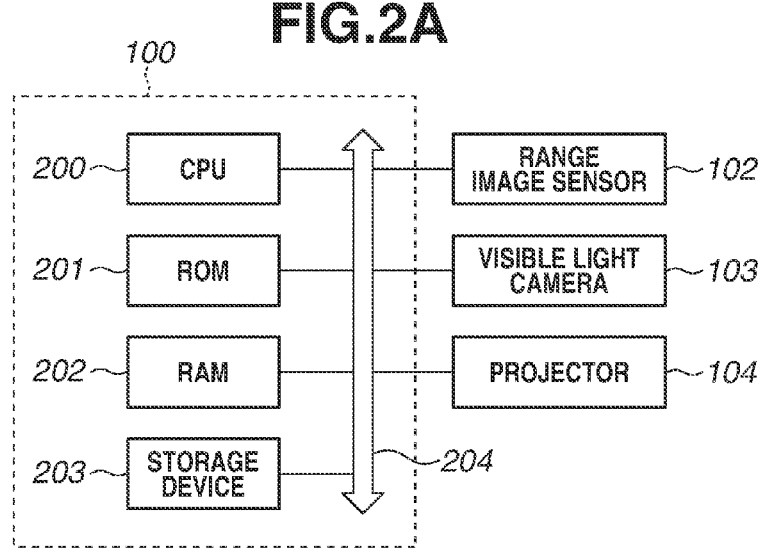
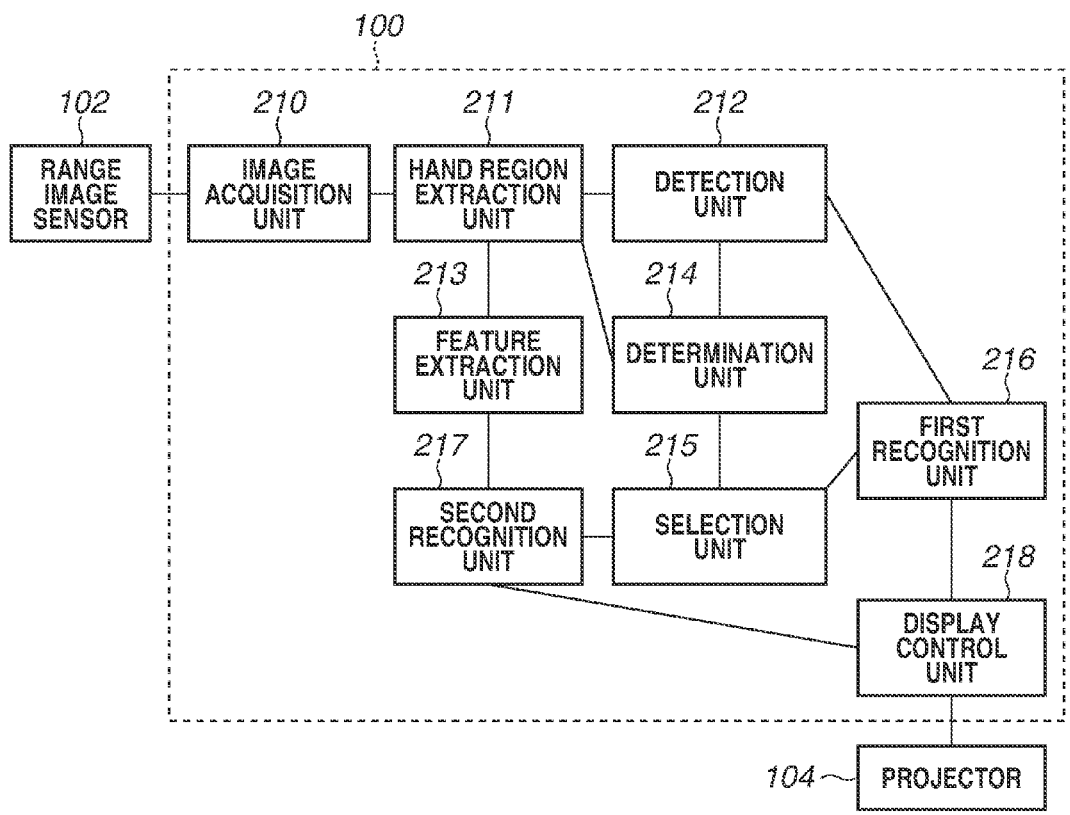

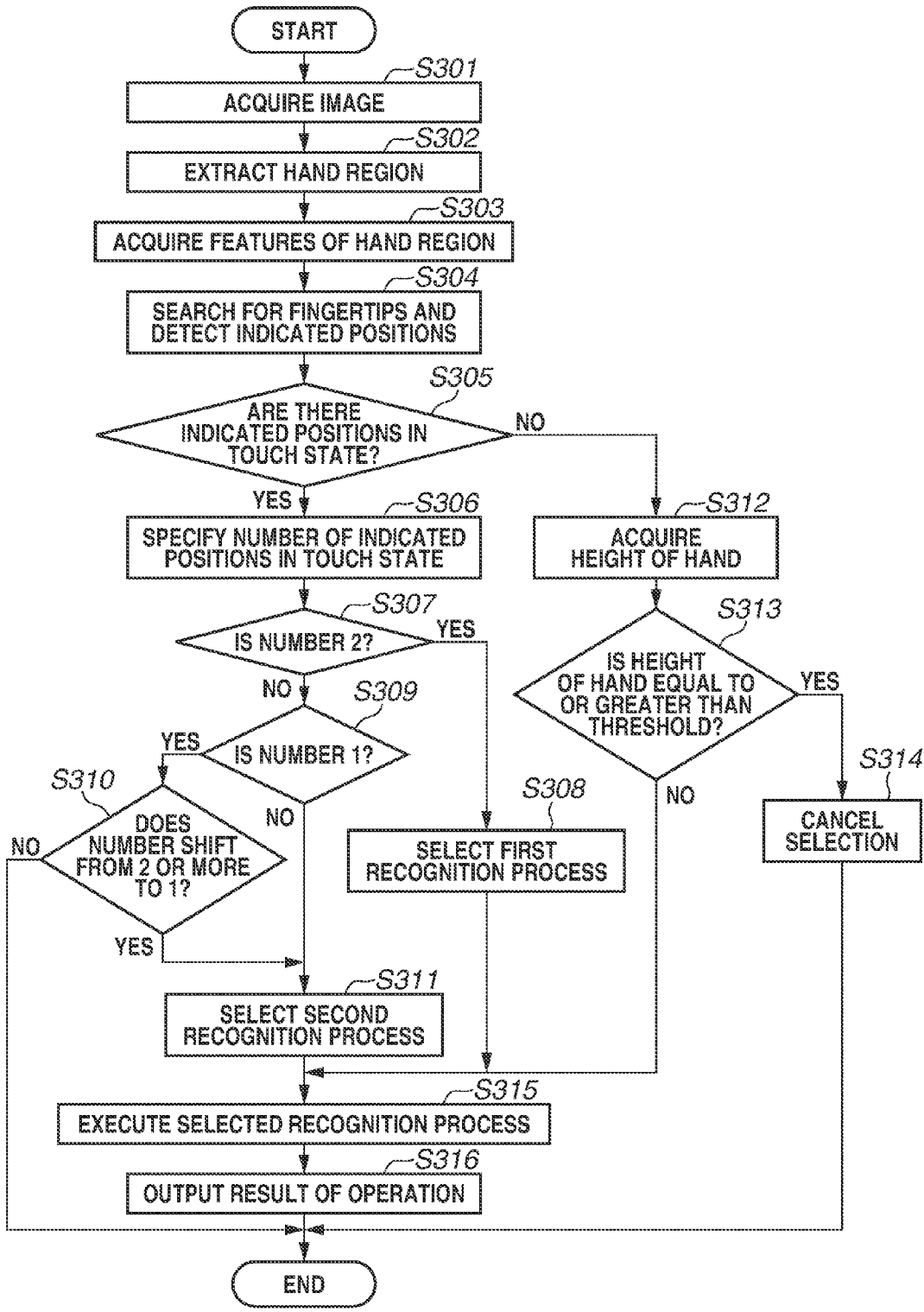

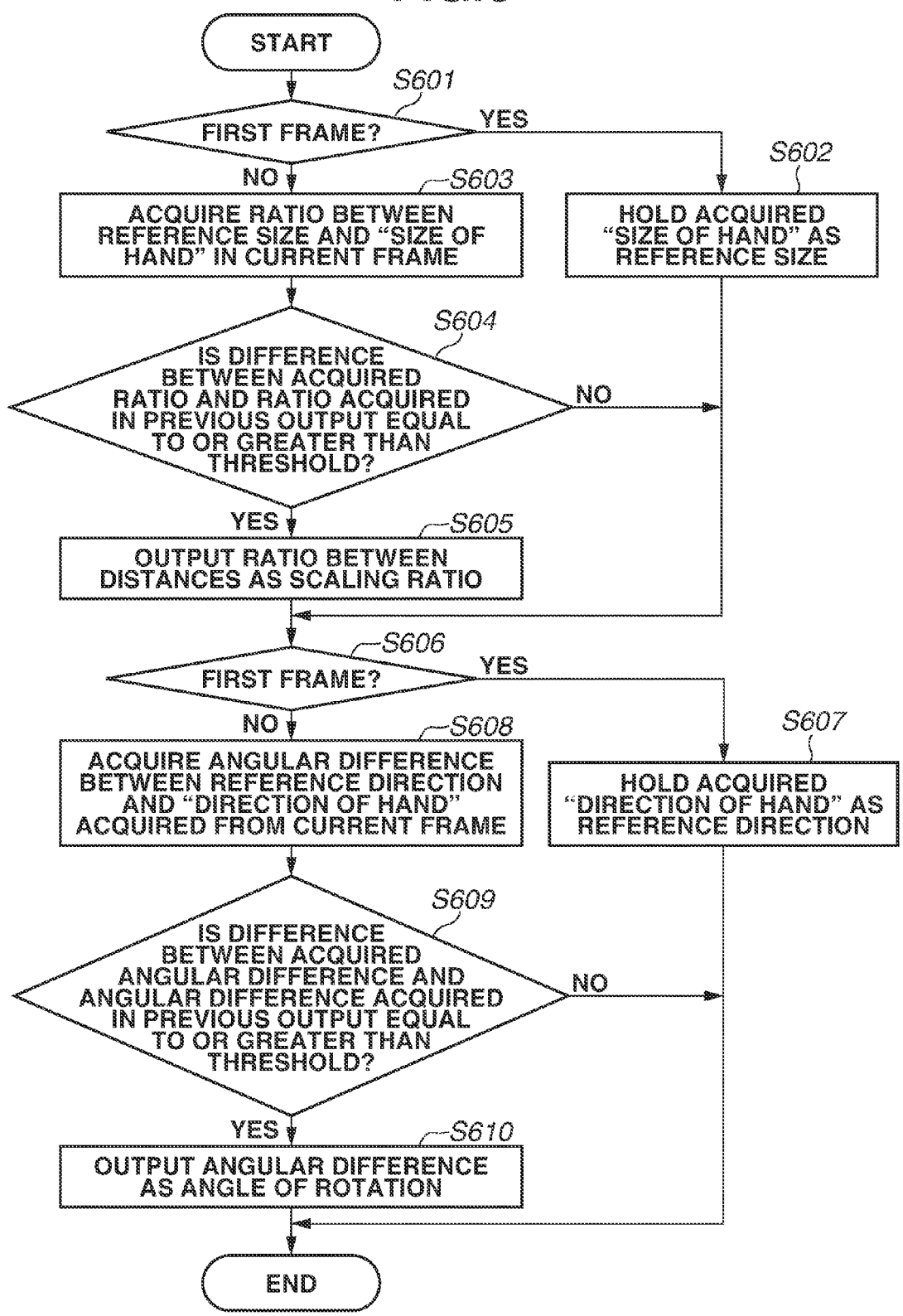

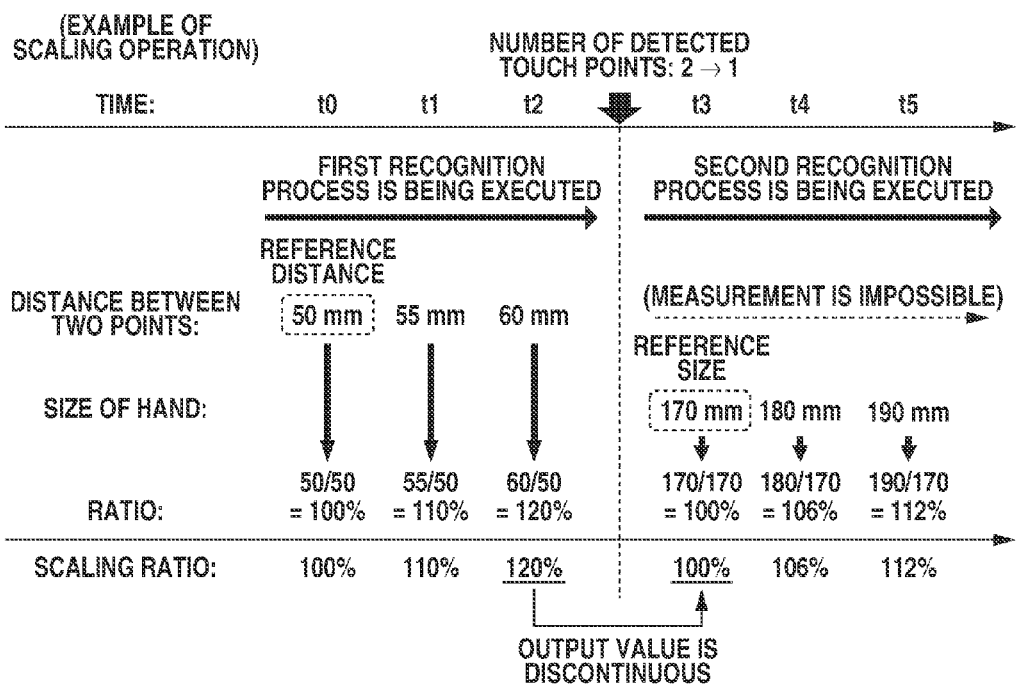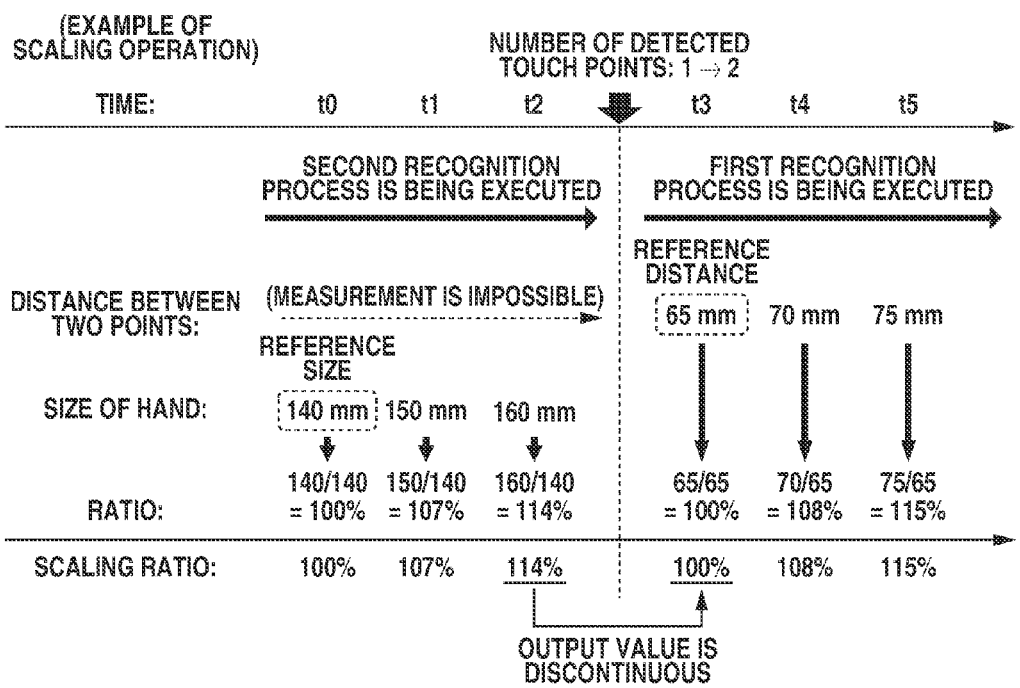

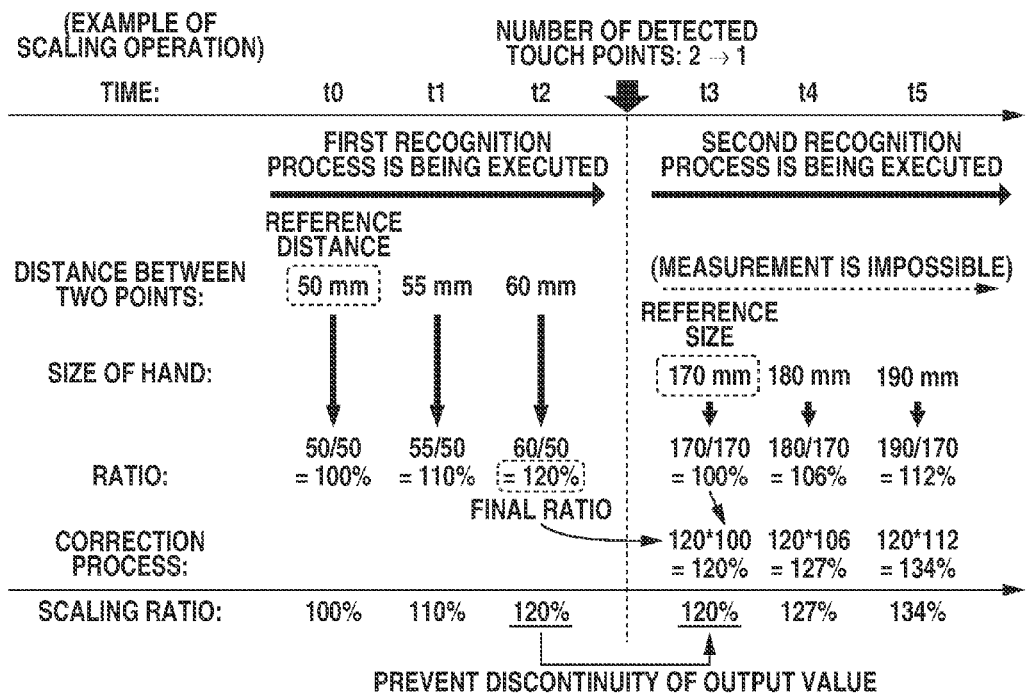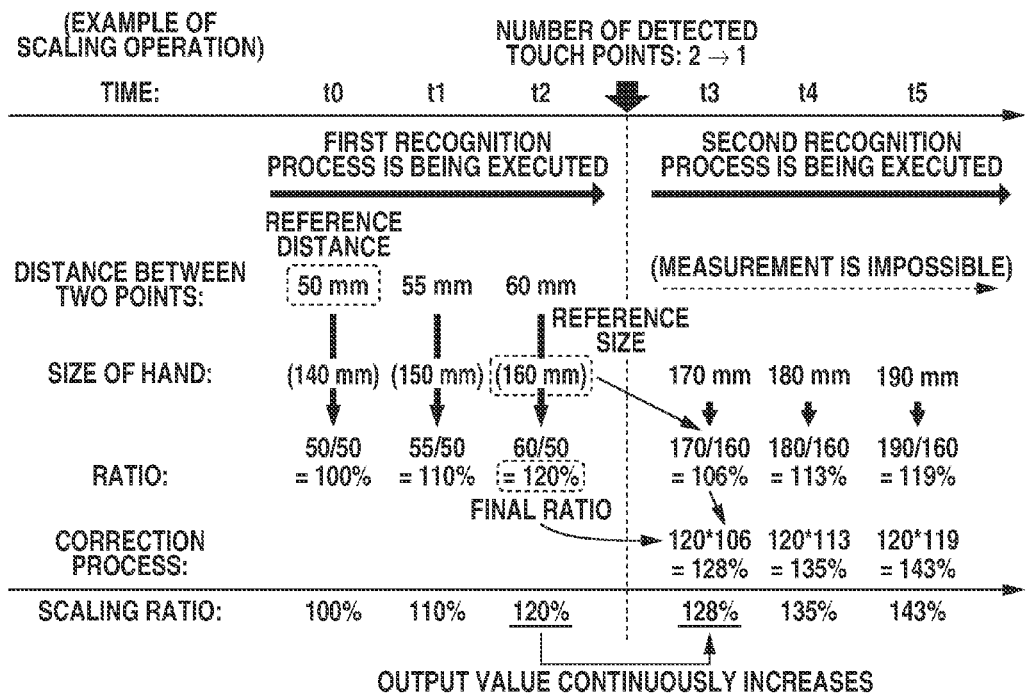

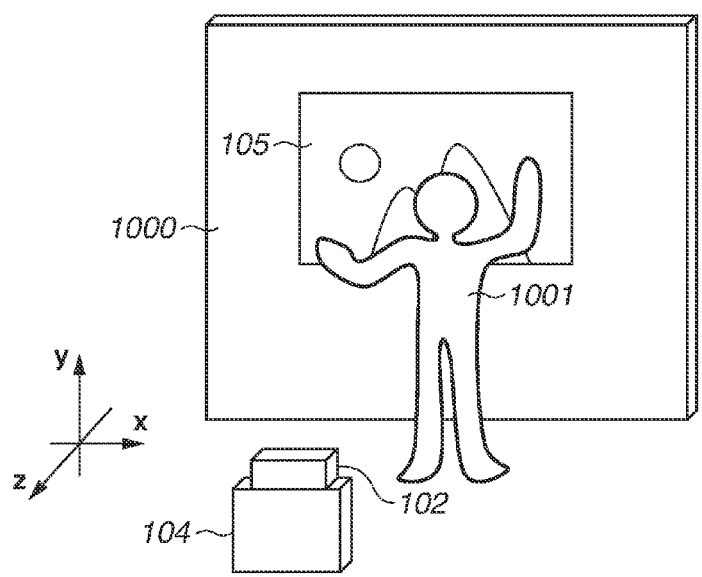
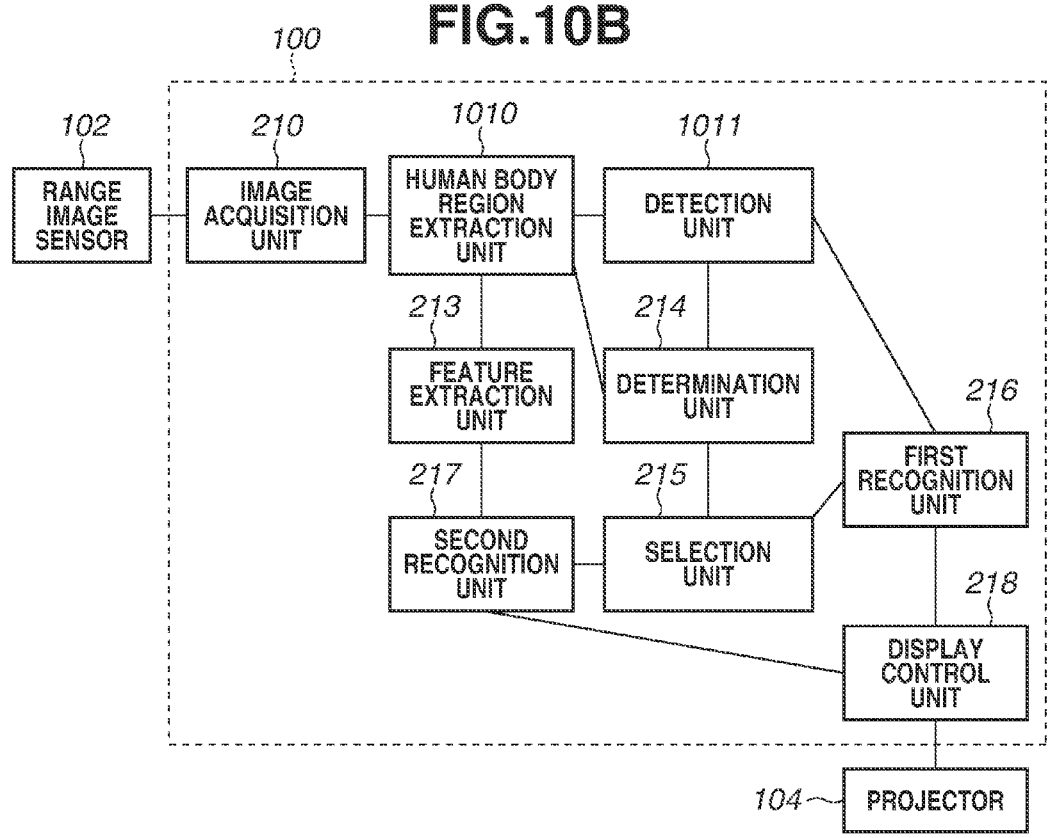

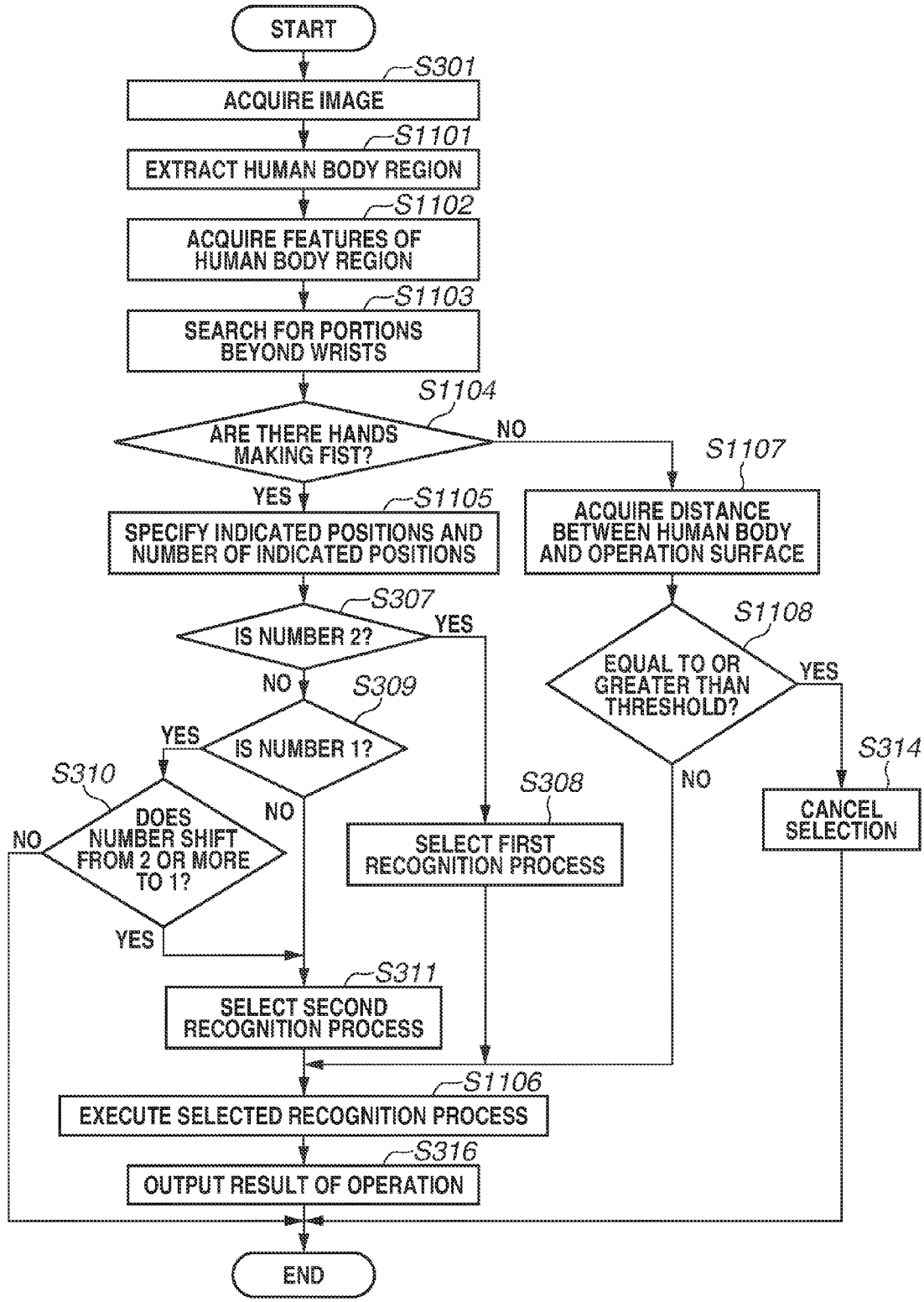

INFORMATION PROCESSING APPARATUS FOR RECOGNIZING USER OPERATION BASED ON AN IMAGE

BACKGROUND OF THE INVENTION

Field of the Invention

The present invention relates to a technique for recognizing a user operation based on a captured image.

Description of the Related Art

In recent years, there is a situation where in an environment, such as augmented reality (AR) or mixed reality (MR), a touch operation is performed on an operation surface that does not physically exist (a virtual surface). Further, there is a situation where a user interface (hereinafter, a "UI") is projected on any operation surface, such as a wall or a desk, and a touch operation is performed on the projected UI. In such situations, it is often the case that the distance between the operation surface and a part of a predetermined operation object (e.g., the fingertip of a user) is determined using an image acquisition means, such as a stereo camera, a range image sensor, or the like, and based on the determination of the distance, it is determined whether the operation surface and the part of a predetermined operation object are in contact with each other. Specifically, a predetermined threshold is provided for the distance between the operation surface and the fingertip of the user.

In a case where an operation based on the movement of a part of a body is recognized using an image, depending on the positional relationship between an image acquisition means and an operator, a part of the body of the operator to be detected may enter the blind spot of the image acquisition means, and there arises an issue that the movement of the part of the body may not be able to be correctly recognized.

In response to the above issue, a technique discussed in the publication of Japanese Patent Application Laid-Open No. 2013-205983 continuously tracks the position and the orientation of the end of the hand of an operator, using a three-dimensional model of the end of the hand. As a result, even if the end of the hand enters a blind spot, it is possible to roughly estimate the position of the end of the hand and continuously recognize a spatial gesture operation based on the movement of the end of the hand.

As in the publication of Japanese Patent Application Laid-Open No. 2013-205983, if the position of a portion hidden in a blind spot is estimated, it is possible to complement information necessary for recognition of a spatial gesture operation based on a large movement of a hand, or the like. It is, however, difficult to accurately estimate the coordinates of an indicated position which is indicated by a fingertip hidden in a blind spot, and to determine whether the fingertip is touching an operation surface.

When a multi-touch operation in which movements of two instruction positions are cooperated is performed to issue an instruction to enlarge or reduce or to rotate a displayed image, only either one of the two indicated positions may be hidden in a blind spot. In the multi-touch operation, if the acquisition of the coordinates of either one of the indicated positions or the touch determination of either one of the indicated positions is failed, it is difficult to correctly recognize the content of the operation.

SUMMARY OF THE INVENTION

According to an aspect of the present invention, an information processing apparatus includes a detection unit configured to detect, from an image obtained by capturing a predetermined object, an indicated position indicated by a part of the predetermined object, an extraction unit configured to extract, from the image, feature information indicating a state of the predetermined object, the feature information being different from the indicated position, a first recognition unit configured to recognize, based on a change in a positional relationship between two or more of the indicated positions detected by the detection unit, an operation to be input to the information processing apparatus, a second recognition unit configured to, based on a change in the feature information extracted by the extraction unit, recognize an operation to be input to the information processing apparatus, and an output unit configured to output either one of recognition results of the first recognition unit and the second recognition unit, the either one of recognition results being selected based on a shift of a number of the indicated positions detected by the detection unit.

Further features of the present invention will become apparent from the following description of exemplary embodiments with reference to the attached drawings.

BRIEF DESCRIPTION OF THE DRAWINGS

FIGS. 2A and 2B are block diagrams illustrating an example of a hardware configuration and a functional configuration of the information processing apparatus according to the first exemplary embodiment.

FIG. 3 is a flowchart illustrating an example of a flow of a multi-touch operation recognition process.

FIG. 6 is a flowchart illustrating an example of a flow of a second recognition process.

FIGS. 7A and 7B are diagrams illustrating examples of states where a recognition result is discontinuous.

FIGS. 8A and 8B are diagrams illustrating examples of correction processes when the first recognition process is switched to the second recognition process.

FIGS. 10A and 10B are diagrams illustrating an example of an external appearance and a functional configuration of a system using an information processing apparatus according to a second exemplary embodiment.

FIG. 11 is a flowchart illustrating an example of a flow of a spatial gesture operation recognition process.

DESCRIPTION OF THE EMBODIMENTS

Figure 1:
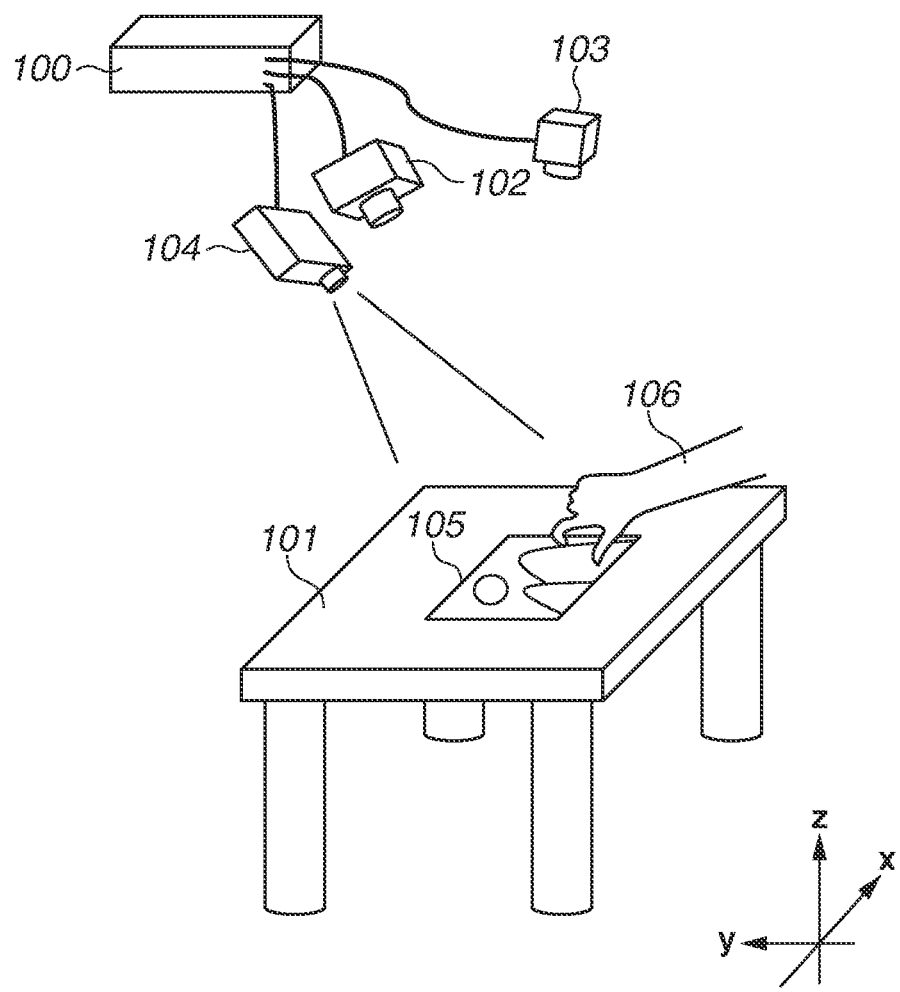
FIG. 1 is a diagram illustrating an example of an external appearance of a system using an information processing apparatus according to a first exemplary embodiment.

With reference to the drawings, information processing according to exemplary embodiments of the present invention will be described in detail below. The configurations described in the exemplary embodiments are merely illustrative, and are not intended to limit the scope of the present invention to these configurations.

First, as a first exemplary embodiment, a description is given of an example of the process of recognizing a multi-touch operation input by an operator using two fingers of one hand in order for the operator to issue an instruction to enlarge or reduce or to rotate an item projected on a table surface of a tabletop interface system.

A multi-touch operation refers to an operation method for inputting an instruction command associated with movements in which while a plurality of independent touch positions is simultaneously indicated, the touch positions are moved according to a predetermined rule. Generally, when a multi-touch operation is input to a portable apparatus, such as a smartphone or a tablet personal computer (PC), it is natural for the operator to support the apparatus with one hand and use a plurality of fingers of the other hand for the multi-touch operation. Thus, the operator is expected to be accustomed to a multi-touch operation using one hand and able to input a multi-touch operation using one hand even when the operator uses not only the portable apparatus but also other devices.

The portable apparatus often acquires coordinate information of a touched position from a touch sensor provided on a display screen. In this case, the fact that the hand used for a multi-touch operation is one hand has particularly little influence on the accuracy of touch detection. In contrast, in the case of a system for determining a contact or non-contact state between a part of an object and a touch target surface based on a range image acquired by a range image sensor or a stereo camera, if the part of the object enters the blind spot of the sensor or the camera, it becomes difficult to accurately detect the part of the object. Particularly, in the case of a multi-touch operation using one hand, the fingertips in the operation are likely to be hidden behind a back-of-the-hand portion and thereby enter the blind spot of the sensor or the camera. If any one of the fingertips used for the multi-touch operation enters the blind spot, it is difficult to accurately determine the proximity state between the finger and the touch target surface, and in addition, it is not possible to track the fingertip. Thus, recognizing an indication provided by the already continued multi-touch operation becomes difficult to be continued. It is cumbersome for the operator that the recognition of the multi-touch operation that is being continuously input is interrupted, and it is also cumbersome for the operator to move the fingertip to a position outside the blind spot to repeat the operation.

In response, in the first exemplary embodiment, if the operator is inputting a multi-touch operation using one hand, the method for recognizing the content of an instruction provided by the multi-touch operation varies according to a change in the number of touch positions detected from a range image. Specifically, while two touch positions are detected, the movements of the two touch positions are traced, thereby recognizing the content of an instruction provided by the multi-touch operation in a conventional manner. Meanwhile, in the present exemplary embodiment, if the detected two touch positions are reduced to one, it is considered that the multi-touch operation is being continued, but the fingertip indicating one of the touch positions is likely to have entered a blind spot. Then, the multi-touch operation is recognized based not on the movements of the touch positions indicated by the fingertips, but on another feature of a hand region extracted from a range image. The present exemplary embodiment is also applicable to the case where a user uses not only fingers but also an instrument, such as a stylus or a robot arm as an object (an operation object) to input a multi-touch operation, so long as it is possible to simultaneously indicate a plurality of independent positions.

[External Appearance of System]

FIG. 1 is an example of the external appearance of a tabletop interface system where an information processing apparatus 100 according to the present exemplary embodiment is installed. FIG. 1 also illustrates coordinate axes defining position information in a three-dimensional space. An operation surface 101 is a table portion of a tabletop interface, and an operator can input a touch operation by touching the operation surface 101. In the present exemplary embodiment, a range image sensor 102 is installed above the operation surface 101 to look down on the operation surface 101. A range image refers to an image in which, on the value of each pixel in the image, information corresponding to the distance from a reference position to the surface of an object captured in the pixel is reflected. The reference position, for example, the lens center of an image capture unit capturing the range image. In the present exemplary embodiment, the distance from the range image sensor 102 to the operation surface 101 or the surface of an object present above the operation surface 101 is reflected on the pixel value of the range image captured by the range image sensor 102. The captured range image is input as an input image to the information processing apparatus 100. The information processing apparatus 100 analyzes the input image to acquire the three-dimensional position of a hand 106 of the operator, thereby recognizing an input operation. Thus, the operator can also input a spatial gesture operation by moving a predetermined object, such as their hand, in the range where the range image sensor 102 can capture an image, in the space between the operation surface 101 and the range image sensor 102. In the present exemplary embodiment, a sensor using a method for acquiring distance information based on the reflection pattern (or the reflection time) of infrared light is employed.

Further, in the present exemplary embodiment, a visible light camera 103 is also installed in such a manner that the visible light camera 103 looks down from above on the operation surface 101. The information processing apparatus 100 controls the visible light camera 103 and causes the visible camera 103 to function as a document camera for capturing an object placed on the operation surface 101 to obtain the read image. Based on a visible light image obtained by the visible light camera 103 or a range image obtained by the range image sensor 102, the information processing apparatus 100 detects and further identifies an object present in the space on the operation surface 101. Examples of the object include the hand of the operator, a document, such as a paper medium or a book, and other three-dimensional objects. In the case of the system illustrated in FIG. 1, however, the angles of view of the range image sensor 102 and the visible light camera 103 do not include the head of the operator present around the table. Thus, to specify the position where the user stands, the system does not detect the face or the head of the user, but requires an estimation process based on the direction and the position of a hand region extracted from a range image.

A projector 104 projects an image on the upper surface of the operation surface 101. In the system according to the preset exemplary embodiment, the operation surface 101 doubles as a display surface, and the operator performs a touch operation or a spatial gesture operation on an item 105 included in the projected image. As described above, in the present exemplary embodiment, a range image acquired by the range image sensor 102 is used for detecting the hand 106 and recognizing an operation. The use of the range image provides the advantage that even if the color of the hand of the user changes under the influence of projected light from the projector 104, the process of detecting a hand region is unlikely to be influenced by the change. As a display device in the present system, the operation surface 101 may be a liquid crystal display, instead of using the projector 104. In this case, it is possible to detect a hand without being influenced by projected light, by also using a method for detecting the hand of a person from an image by detecting a skin-color region from a visible light image.

The range image sensor 102 and the visible light camera 103 do not necessarily need to be installed above the operation surface 101 so long as the range image sensor 102 and the visible light camera 103 are configured to obtain a top-view image of the operation surface 101. For example, a camera may be installed to capture reflected light from a mirror installed above the operation surface 101. In the example of FIG. 1, the projector 104 also projects an image on the operation surface 101 while looking down from obliquely above. Alternatively, projected light projected in a different direction may be reflected on the operation surface 101, using a mirror.

In the present exemplary embodiment, xyz-axes illustrated in FIG. 1 are defined in a three-dimensional space on the operation surface 101 to process position information. In this case, as an example, it is assumed that two dimensions parallel to the upper surface of the table is the xy-plane, and a direction orthogonal to the upper surface of the table and extending upward is the positive direction of the z-axis. In the present exemplary embodiment, the z-axis direction corresponds to the height direction in a world coordinate system. The present exemplary embodiment, however, is also applicable to a system where the operation surface 101 is a surface that is not horizontal, such as a whiteboard or a wall surface.

[Configurations of Apparatus]

FIG. 2A is a hardware configuration diagram of the tabletop interface including the information processing apparatus 100 according to the present exemplary embodiment. A central processing unit (CPU) 200 executes an operating system (OS) and a program stored in a read-only memory (ROM) 201 or a storage device 203, using a random-access memory (RAM) 202 as a work memory, and performs calculations and logical determinations in various processes, thereby controlling each component connected to a system bus 204. The processing executed by the CPU 200 includes a multi-touch operation recognition process. The storage device 203 is a hard disk drive or an external storage device connected to the information processing apparatus 100 via various interfaces and stores programs and various types of data related to the operation recognition process in the exemplary embodiments. According to the control of the CPU 200, the range image sensor 102 captures a range image of space including the table on which an item is displayed and the hand of the operator operating the item. Then, the range image sensor 102 outputs the captured range image to the system bus 204. In the present exemplary embodiment, the method for acquiring a range image is described based on an infrared pattern projection method, in which the influence of ambient light and display on the table surface is small. Alternatively, a parallax method or a method using the reflection time of infrared light (Time-of-Flight method) can also be employed according to use. According to the control of the CPU 200, the projector 104 projects and displays an image item as an operation target on the table.

In an example of use of FIG. 1, each of the visible light camera 103, the range image sensor 102, and the projector 104 is an external apparatus connected to the information processing apparatus 100 via an input/output interface and is included together with the information processing apparatus 100 in an information processing system. Alternatively, these devices may be integrated into the information processing apparatus 100.

FIG. 2B is a block diagram illustrating an example of the functional configuration of the information processing apparatus 100 according to the present exemplary embodiment. Each function unit is achieved by the CPU 200 loading a program stored in the ROM 201 into the RAM 202 and executing processing according to each flowchart described later. Further, for example, to configure hardware as an alternative to a software process using the CPU 200, a calculation unit and a circuit that correspond to the processing of each function unit may be configured.

An image acquisition unit 210 acquires a range image captured by the range image sensor 102, as an input image at regular time intervals and holds the input image in the RAM 202 as needed. Although the target to be acquired by the image acquisition unit 210 and exchanged between the image acquisition unit 210 and each function unit is actually a signal corresponding to image data, the above acquisition is expressed simply as "acquiring a range image" or "acquiring an input image" in the specification.

A hand region extraction unit 211 performs a threshold determination and a noise reduction process on each pixel in the input image acquired by the range image acquisition unit 210 and extracts a hand region in the range image. The hand region refers to, in the input range image, a region where the hand used as an operation object by the operator appears. A detection unit 212 detects the fingertip positions of the hand of the operator based on contour information of the hand region extracted by the hand region extraction unit 211 and specifies the coordinate values of the fingertip positions as indicated positions.

A feature extraction unit 213 extracts a feature regarding the state of the hand as the operation object from the hand region portion extracted by the hand region extraction unit 211 in the input image. The feature to be extracted is selected according to the type of a multi-touch operation that can be recognized by the information processing apparatus 100. In the present exemplary embodiment, information regarding the size and the direction of the hand region is extracted. Alternatively, only either of the size and the direction may be processed. Yet alternatively, another feature may be further extracted.

Based on the coordinates of the indicated positions detected by the detection unit 212 and pixel value information of the hand region extracted by the hand region extraction unit 211, a determination unit 214 determines the presence or absence of a touch input provided by the operation object. Specifically, if the z-coordinate (a value corresponding to the height from the operation surface) of at least one of the indicated positions is smaller than a predetermined touch threshold, the determination unit 214 determines that the operation object is in a touch state. A touch state refers to a state where a touch operation is being input. If there is not an indicated position of which the z-coordinate is smaller than the threshold, then based on the pixel values in the hand region, the determination unit 214 acquires information corresponding to the height of the hand and determines, by a threshold determination process, whether the hand is at a position sufficiently higher than the operation surface. The threshold compared with the height of the hand is a value different from the touch threshold compared with the z-coordinate of the indicated position and is greater than the touch threshold. If the height of the hand is at a position sufficiently higher than the operation surface, the determination unit 214 determines that the operation object is in a non-touch state where a touch input is not being performed.

A selection unit 215 selects a processing method for recognizing a multi-touch operation according to the shift of the number of indicated positions in a touch state among the indicated positions detected by the detection unit 212. In the case of the present exemplary embodiment, if the number of indicated positions shifts to two, a conventional multi-touch operation recognition process based on a change in the positional relationship between the indicated positions (hereinafter, a "first recognition process") is selected. If, on the other hand, the number of indicated positions shifts from two to one, or if three or more indicated positions are detected, a multi-touch operation recognition process based on a change in the state of the hand indicated by the feature of at least a part of the hand region extracted by the feature extraction unit 213 (hereinafter, a "second recognition process") is selected.

If the first recognition process is selected by the selection unit 215 based on the case in which the detected state of indicated positions shifts to a state where two indicated positions are detected, a first recognition unit 216 recognizes a predetermined multi-touch operation by the first recognition process. If the second recognition process is selected by the selection unit 215 based on the case in which the number of detected indicated positions shifts from two to one, a second recognition unit 217 recognizes a predetermined multi-touch operation by the second recognition process. Further, in the present exemplary embodiment, also if three or more indicated positions are detected, the selection unit 215 selects the second recognition process. Predetermined multi-touch operations that can be recognized in the present exemplary embodiment include a multi-touch operation for issuing an instruction to enlarge or reduce an image displayed on the operation surface 101 (hereinafter, a "scaling operation") and a multi-touch operation for giving an instruction to rotate the displayed image (hereinafter, a "rotation operation"). The predetermined operation that can be recognized as a scaling operation in the present exemplary embodiment is not limited to enlargement or reduction in which the image aspect ratio is fixed, but includes all instructions to change a length regarding the displayed image. Further, the predetermined operation that can be recognized as a rotation operation is not limited to rotation in which the center of rotation is fixed, but includes all instructions to change a direction regarding the displayed image.

Using information stored in the ROM 201 or the storage device 203, a display control unit 218 generates an image to be projected on the operation surface 101 by the projector 104, which is a display unit according to the present exemplary embodiment. For example, based on the result of the first recognition unit 216 or the second recognition unit 217 recognizing a multi-touch operation, the display control unit 218 performs deformation, such as enlargement or reduction, or rotation, on at least a part of an image displayed by the display unit, thereby causing the display unit to output the resulting image. The output image is projected and displayed on the table, which is the operation surface 101, by the projector 104. The image to be projected may include a plurality of items, and each item may be able to be moved, enlarged or reduced, or rotated. Further, the entirety of the image may be moved, enlarged or reduced, or rotated.

[Multi-Touch Operation Recognition Process]

With reference to a flowchart in FIG. 3, a multi-touch operation recognition process according to the first exemplary embodiment is described. The processing of the flowchart in FIG. 3 is achieved by the CPU 200, which configures each function unit of the information processing apparatus 100, loading a program recorded in the ROM 201 into the RAM 202 and executing the program. Further, this processing is started based on the case in which a range image captured by the range image sensor 102 is input to the information processing apparatus 100.

In step S301, the image acquisition unit 210 acquires from the range image sensor 102 a range image obtained by capturing space including the table on which an image is projected and the hand of the operator. For each pixel in the acquired range image, a value corresponding to the distance between the sensor and an object is held as a pixel value. Thus, the pixel value is subjected to coordinate transformation based on the lens characteristics of the range image sensor 102 and the relative positional relationship between the range image sensor 102 and the operation surface 101, whereby it is possible to map the coordinates of the pixel in a real-world coordinate system defined on the table.

In step S302, the hand region extraction unit 211 scans each pixel in the range image, thereby extracting from the range image a hand region where the hand of the operator appears. In the present exemplary embodiment, the hand region extraction unit 211 obtains, with respect to each pixel, the difference between the input range image including the hand of the operator and a range image acquired in advance and including only a background (a range image obtained by capturing only the table), and extracts a pixel where the difference is greater than a threshold as a hand region. That is, a region including a group of pixels where the height from the upper surface of the table is higher than a threshold is regarded as a region where the hand present above the table appears. Then, this region is extracted. This method is termed a background subtraction method. Further, the hand region extraction unit 211 performs an expansion/contraction process on the extracted region to remove minute noise resulting from an error of the range image sensor 102, thereby correcting the hand region. Depending on the environment, it is also possible to extract a pixel where the distance from the sensor is closer than a threshold as a hand region. In this case, it is not necessary to acquire in advance a range image, in which only the table is captured, for use as a background image.

In step S303, the feature extraction unit 213 acquires the features of the hand from the hand region extracted in step S302. In the present exemplary embodiment, the feature extraction unit 213 acquires the size of the hand and the inclination (the direction in the xy-plane) of the hand. In this process, the size of the hand is acquired as a feature for recognizing a scaling operation. Further, the inclination of the hand is acquired as a feature for recognizing a rotation operation. The features of the hand acquired in step S303 and the processes of recognizing operations using the acquired features will be described later.

In step S304, based on the hand region extracted in step S302, the detection unit 212 searches for positions corresponding to fingertips and detects the three-dimensional coordinates of these positions as indicated positions. In the present exemplary embodiment, first, the detection unit 212 extracts contour points in the hand region and calculates the angles between the vectors formed by adjacent contour points. Then, the detection unit 212 extracts, as a candidate point for a fingertip position, a contour point where the angle between the vectors is smaller than a threshold. Further, the detection unit 212 specifies, as a fingertip, the position where a plurality candidate points for fingertip positions is densely present. That is, the detection unit 212 specifies, as a fingertip position, the extremity of a portion representing a tip portion having a relatively narrow contour. Based on the specified fingertip position, the pixel value of the range image, and coordinate transformation parameters for the real world coordinate system, it is possible to calculate the three-dimensional coordinates of an indicated position in the real world coordinate system defined on the table. Further, based on the distance relationships between the indicated positions detected in the previous frame and the latest indicated positions, the detection unit 212 associates the same fingertips with each other between the frames. The method for detecting indicated positions is not limited to this. Alternatively, it is also possible to use circular template matching or a method for narrowing down positions using constraints based on the structure of the hand. In the present exemplary embodiment, the pixel value of the range image indicates the distance between the range image sensor 102 and an object. Thus, the height of the fingertip (the z-coordinate of the indicated position) is acquired by calculating the value of the distance from the table to the fingertip based on the pixel value of a pixel corresponding to the detected fingertip position in the range image and height information of the table. It is, however, also possible to simply calculate, as a value corresponding to the height of the fingertip, the difference between pixel values corresponding to the fingertip position in the background image obtained by capturing only the table and in the input range image.

In step S305, based on information corresponding to the heights in the coordinate information of the indicated positions acquired in step S304, the determination unit 214 determines whether there are indicated positions in a touch state. In the present exemplary embodiment, a touch threshold and a non-touch threshold higher than the touch threshold are provided, and the determination unit 214 determines that an indicated position present at a position lower than the touch threshold is in a touch state. When the indicated position once determined as being in a touch state moves to a position higher than the non-touch threshold, the indicated position is determined as being in a non-touch state. Each threshold is thus provided, whereby it is possible to avoid the situation where due to an error in the detection of the range image sensor 102, it is determined that a finger that should be touching is in a non-touch state, and the operation is interrupted. If it is determined that there are indicated positions in a touch state (YES in step S305), the processing proceeds to step S306. If it is determined that there are no indicated positions in a touch state (NO in step S305), the processing proceeds to step S312.

In step S306, the selection unit 215 specifies the number of the indicated positions in the touch state. The number to be specified corresponds to the number of touch positions indicated by the user touching the operation surface. The selection unit 215 holds the specified number in the RAM 202. In step S307, the selection unit 215 determines whether the specified number of the indicated positions in the touch state is two. If it is determined that the specified number is two (YES in step S307), the processing proceeds to step S308. In step S308, the selection unit 215 selects the first recognition process. The selection unit 215 holds, in the RAM 202, information indicating that the first recognition process is selected. The selection unit 215 also notifies the first recognition unit 216 of a signal instructing the first recognition unit 216 to execute the recognition process. If, on the other hand, it is determined that the number of the indicated positions in the touch state is not two (NO in step S307), the processing proceeds to step S309.

In step S309, the selection unit 215 determines whether the specified number of the indicated positions in the touch state is one. If it is determined that the number of the indicated positions in the touch state is one (YES in step S309), the processing proceeds to step S310. If, on the other hand, it is determined that the number of the indicated positions in the touch state is not one (NO in step S309), the processing proceeds to step S311. The case where the processing proceeds from step S309 to step S311 corresponds to the case where the number of the indicated positions in the touch state is three or more.

In step S310, the selection unit 215 determines whether the specified number of the indicated positions in the touch state shifts from two or more to one. The selection unit 215 performs this determination with reference to information of the number of the indicated positions held in the RAM 202. If it is determined that the number of the indicated positions in the touch state shifts from two or more to one (YES in step S310), the processing proceeds to step S311. If, on the other hand, it is determined that the number of the indicated positions in the touch state does not shift from two or more to one (NO in step S310), the processing ends. The case where the number of the indicated positions in the touch state does not shift from two or more to one is the case where the number shifts from zero to one. In the present exemplary embodiment, in this case, it is considered likely that the operator intends to perform a single-touch operation using one indicated position from the beginning, or that the current state is the state before a second indicated position is touched. Thus, the selection unit 215 exits the flowchart in FIG. 3, which is a multi-touch operation recognition process. In step S311, the selection unit 215 selects the second recognition process. The selection unit 215 holds, in the RAM 202, information indicating that the second recognition process is selected. The selection unit 215 also notifies the second recognition unit 217 of a signal instructing the second recognition unit 217 to execute the recognition process.

If, on the other hand, there are no indicated positions in a touch state (touch positions) in step S305, then in step S312, the determination unit 214 acquires the height of the hand based on the extracted hand region. In the present exemplary embodiment, the determination unit 214 obtains, as the height of the hand, height information regarding a pixel value corresponding to the center of gravity of the hand region. The height of the hand, however, is acquired not only by the method for employing the pixel value of the center of gravity. Alternatively, for example, the average of the pixel values of a portion beyond the wrist may be used. In step S313, the determination unit 214 determines whether the acquired height of the hand is equal to or greater than a predetermined height threshold. If it is determined that the height of the hand is smaller than the predetermined height threshold (NO in step S313), the processing proceeds to step S315. Then, the recognition process in the selected state as a result of the previous process is executed. If, on the other hand, it is determined that the height of the hand is equal to or greater than the predetermined height threshold (YES in step S313), the processing proceeds to step S314. In step S314, the selection unit 215 cancels the selection of the recognition process. In the present exemplary embodiment, the selection unit 215 references information, which indicates the recognition process in the selected state and is held in the RAM 202, notifies the corresponding recognition unit of the cancellation of the selection, and deletes the information. The details of the process of selecting and canceling gesture recognition based on the number of the two detected indicated positions in the touch state will be described later.

Then, in step S315, the recognition process in the selected state is executed. If the first recognition process is selected in step S308, then in step S315, the first recognition unit 216 recognizes a predetermined multi-touch operation based on a change in the positional relationship between the two indicated positions in the touch state. If the second recognition process is selected in step S311, then in step S315, the second recognition unit 217 recognizes a predetermined multi-touch operation based on a change in the state of the hand of the operator based on the features extracted by the feature extraction unit 213. The details of each recognition process will be described later. In step S316, based on either of the recognition results of the first recognition unit 216 and the second recognition unit 217 in step S315, the display control unit 218 controls output to the projector 104, which is the display unit. For example, if a scaling operation is recognized, the display control unit 218 enlarges or reduces the displayed image according to the scaling ratio output in step S315. Further, if a rotation operation is recognized, the display control unit 218 rotates the displayed image according to the angle of rotation output in step S315.

In the present exemplary embodiment, the multi-touch operation recognition process in steps S301 to S316 is repeatedly performed every time a range image is input from the range image sensor 102. Thus, the cycle of repeating the process coincides with the frame rate of an image captured by the range image sensor 102.

[First Recognition Process]

A description is given of the details of the recognition process executed in step S315 in the case where the first recognition process is selected in step S308. In the first recognition process, a multi-touch operation is recognized based on a change in the positional relationship between two indicated positions in a touch state. In the present exemplary embodiment, a multi-touch operation for inputting an instruction to enlarge or reduce the displayed image can be recognized based on a change in the distance between at least two indicated positions. A multi-touch operation for issuing an instruction to enlarge the display image by widening the distance between two indicated positions is occasionally termed a pinch-out operation. A multi-touch operation for issuing an instruction to reduce the display image by narrowing the distance between two indicated positions is occasionally termed a pinch-in operation. Further, in the present exemplary embodiment, a multi-touch operation for inputting an instruction to rotate the displayed image based on the relative rotation between two indicated positions can be recognized. The above operations, however, are merely illustrative, and the present invention is not limited to these.

Figure 4:
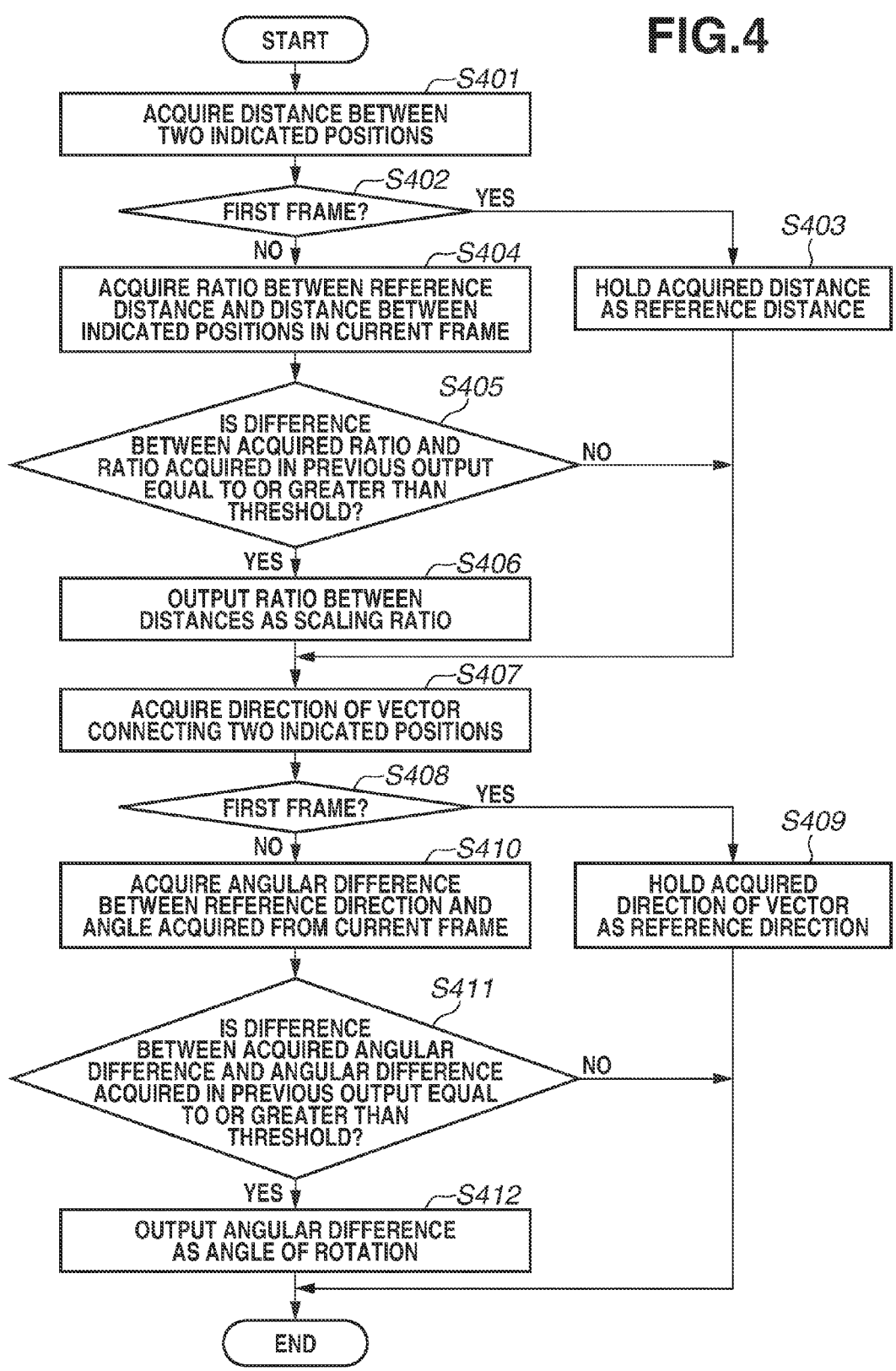
FIG. 4 is a flowchart illustrating an example of a flow of a first recognition process.

With reference to a flowchart in FIG. 4, a description is given of the flow of the multi-touch operation recognition process executed by the first recognition unit 216 in step S315. First, in step S401, the first recognition unit 216 acquires the Euclidean distance between the two indicated positions. In step S402, the first recognition unit 216 determines whether the current processing frame is the first frame for starting the first recognition process. If it is determined that the current processing frame is the first frame (YES in step S402), the processing proceeds to step S403. If it is determined that the current processing frame is not the first frame (NO in step S402), the processing proceeds to step S404. In step S403, the first recognition unit 216 holds in the RAM 202, as information of a reference distance, information indicating the distance between the two indicated positions acquired from the current frame in step S401.

In step S404, the first recognition unit 216 acquires, by calculation, the ratio between the distance held in the RAM 202 as the reference distance and the distance between the two indicated positions acquired from the current frame. In step S405, the first recognition unit 216 determines whether the difference between the acquired ratio and the ratio acquired in the previous output is equal to or greater than a predetermined threshold. If it is determined that the difference is equal to or greater than the threshold (YES in step S405), the processing proceeds to step S406. In step S406, the first recognition unit 216 outputs the ratio acquired in step S404 to the display control unit 218 as the scaling ratio of the display image indicated by a multi-touch operation. If it is determined that the difference is smaller than the threshold (NO in step S405), step S406 is skipped, and the processing proceeds to step S407.

In step S407, the first recognition unit 216 acquires, as the direction of the vector connecting the two indicated positions, the angle of rotation of the vector about the x-axis. In step S408, the first recognition unit 216 determines whether the current processing frame is the first frame for starting the first recognition process. If it is determined that the current processing frame is the first frame (YES in step S408), the processing proceeds to step S409. If it is determined that the current processing frame is not the first frame (NO in step S408), the processing proceeds to step S410. In step S409, the first recognition unit 216 holds, as information of a reference direction in the RAM 202, the angle of rotation acquired from the current frame in step S407.

In step S410, the first recognition unit 216 acquires, by calculation, the angular difference between the angle of rotation about the x-axis held in the RAM 202 as the reference direction and the angle of rotation acquired from the current frame. In step S411, the first recognition unit 216 determines whether the difference between the acquired angular difference and the angular difference acquired in the previous output is equal to or greater than a predetermined threshold. If it is determined that the difference is equal to or greater than the threshold (YES in step S411), the processing proceeds to step S412. In step S412, the first recognition unit 216 outputs the angular difference acquired in step S410 to the display control unit 218 as the angle of rotation of the display image indicated by a multi-touch operation. If it is determined that the difference is smaller than the threshold (NO in step S411), step S412 is skipped, and the processing of the flowchart in FIG. 4 ends.

If once set, the reference distance and the reference direction are not changed until the selected state of the first recognition process is canceled. In the present exemplary embodiment, when the selection is canceled based on the process of step S316, the information of the reference distance and the reference direction is deleted from the RAM 202. Further, if the information processing apparatus 100 does not recognize a scaling operation, the processes of steps S401 to S406, which correspond to a scaling operation, can be omitted. Similarly, if the information processing apparatus 100 does not recognize a rotation operation, the processes of steps S407 to S412, which correspond to a rotation operation, can be omitted.

[Second Recognition Process]

Next, a description is given of the details of the recognition process executed in step S315 in the case where the second recognition process is selected in step S311. In the second recognition process, as a complementary method for the case where two indicated positions cannot be detected, a predetermined multi-touch operation is recognized based on a change in the state of the hand indicated by the features of the hand that can be extracted from the hand region regardless of whether indicated positions can be detected. In the second recognition process, by a method different from that of the first recognition process, it is possible to recognize each of indications provided by a pinch-out operation, a pinch-in operation, and a rotation operation that can be recognized by the first recognition process.

Figure 5A:
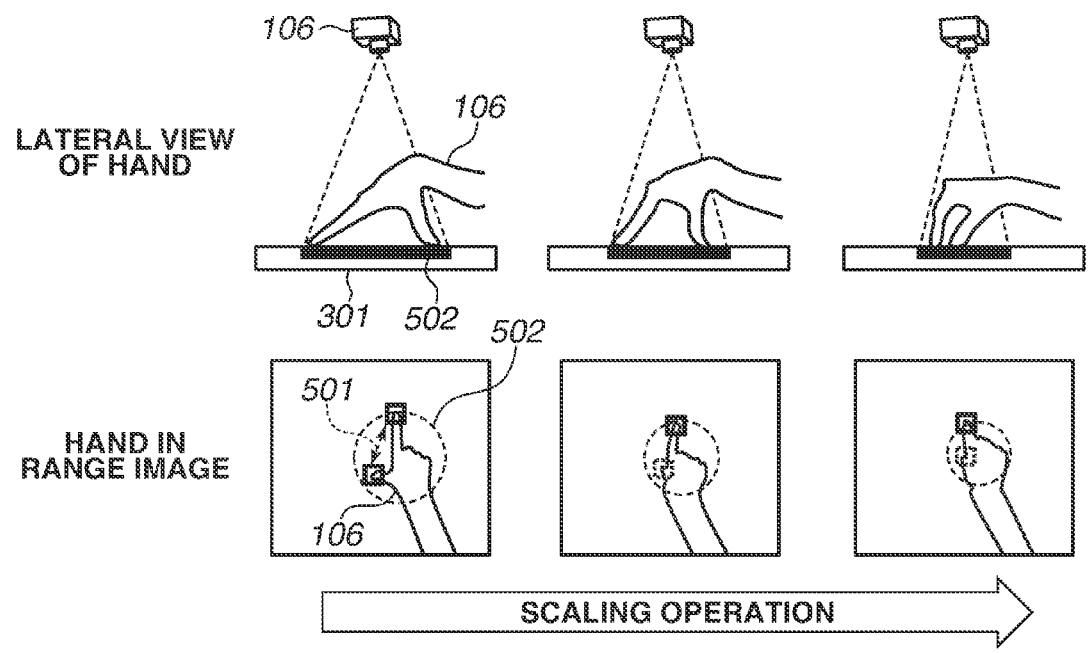
FIGS. 5A and 5B are diagrams illustrating states of a hand in a scaling operation and a rotation operation.

In the present exemplary embodiment, a scaling operation is recognized using, as information as an alternative to a change in the distance between two indicated positions, a change in the size of the appearance of the hand (the size of a portion that can be visually recognized as a hand, which is hereinafter referred to simply as "the size of the hand") indicated by the features extracted from the hand region. The upper part of FIG. 5A illustrates the state of the appearance of the hand 106 in a pinch-in operation as viewed along the xy-plane. The lower part of FIG. 5A illustrates the state of the appearance of the hand 106 in a range image at the same timing. It is understood from FIG. 5A that as a distance 501 between two indicated positions decreases by the pinch-in operation, the size of a circle 502 indicating the size of the appearance of the hand in the range image changes. This is a change that can be independently and continuously detected even if any of the fingertips enters the blind spot of the sensor, and the indicated position itself cannot be detected. In response, in the second recognition process, if the size of the hand region in the range image increases, the operation is recognized as a scaling operation indicating enlargement. If the size of the hand region in the range image decreases, the operation is recognized as a scaling operation indicating reduction. Then, the scaling ratio according to the amount of change in the size of the hand region is output. However, the distance between two indicated positions can be close to approximately 0, whereas the lower limit of the size of the appearance of the hand is about the size of a fist. Thus, the reduction ratio obtained based on a change in the distance between two indicated positions does not necessarily coincide with the reduction ratio obtained based on a change in the size of the appearance of the hand.

In the present exemplary embodiment, in step S303, the feature extraction unit 213 specifies the circumcircle of a portion beyond the wrist in the hand region as a figure approximated to the shape of the hand and calculates the diameter of the circumcircle as "the size of the hand". A so-called "hand" portion beyond the wrist is a portion of which size of the appearance changes when the fingers are moved for a pinch-in operation or a pinch-out operation. A feature is acquired by specifying a "hand" portion from the hand region and excluding the area of an "arm" portion, whereby it is possible to more sensitively detect a change in the size of the hand due to a pinch-in operation or a pinch-out operation. However, if a feature is extracted from, in the extracted hand region, a part including at least the "hand" portion, it is possible to detect a change in the size of the hand due to a pinch-in operation or a pinch-out operation. Thus, a feature may be extracted from the entirety or a part of a region including the "arm". According to the installation position of the range image sensor 102 in addition to the size of the circumcircle, the size of the area of the hand region, or the longest distance from the center of a back-of-the-hand portion to contour points in the hand region may be extracted as "the size of the hand".

Figure 5B:
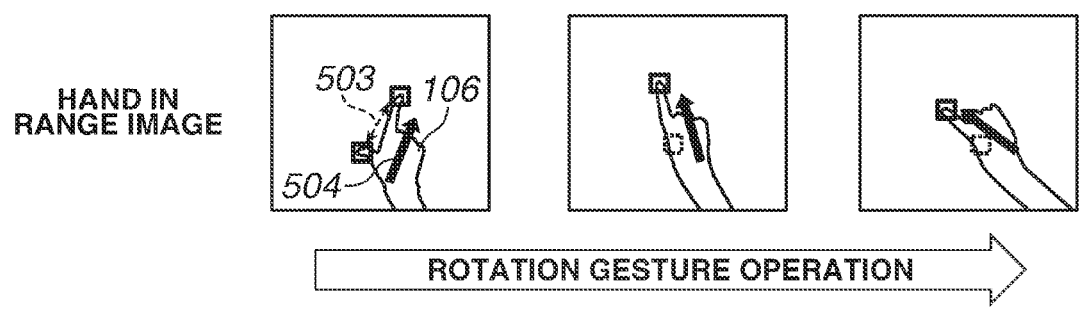

Further, in the second recognition process, a rotation operation is recognized based on the direction of the appearance of the hand (hereinafter referred to simply as "the direction of the hand"). FIG. 5B illustrates the state of the appearance of the hand 106 in a rotation operation. It is understood from FIG. 5B that as the direction of a vector 503 connecting two indicated positions in the rotation operation changes, a vector 504 indicating the direction of the hand in the range image also changes. This is a change in a feature that can be independently and continuously detected even if any of the fingertips enters the blind spot of the sensor. Therefore, in the second recognition process, a rotation operation is recognized according to a change in the direction of the hand region in the range image, and the angle of rotation according to the amount of change in the direction of the hand region is output. In the present exemplary embodiment, in step S303, the feature extraction unit 213 calculates the direction of the principal axis of inertia of the hand region as "the direction of the hand". In the process of calculating the direction of the hand, the process of specifying a portion beyond the wrist in the hand region and excluding pixels corresponding to the arm of the operator may be performed, and then, the direction of the principal axis of inertia may be obtained. Attention is paid to a portion beyond the wrist, whereby it is possible to more sensitively detect a change due to the movements of the fingers. "The direction of the hand" is defined not only by the direction of the principal axis of inertia of the hand region. Alternatively, for example, two points in the hand region may be specified based on the shape of the hand region, and the direction of the vector connecting these two points may be defined as the direction of the hand.

With reference to a flowchart in FIG. 6, a description is given of the flow of the second recognition process performed by the second recognition unit 217 in step S315. In the second recognition process, first, in step S601, the second recognition unit 217 determines whether the current processing frame is the first frame for starting the second recognition process. If the current processing frame is the first frame (YES in step S601), then in step S602, the second recognition unit 217 holds, as information of a reference size in the RAM 202, the information of "the size of the hand" obtained in step S303. If the current processing frame is not the first frame (NO in step S601), then in step S603, the second recognition unit 217 acquires the ratio of "the size of the hand" in the current frame to the reference size. In step S604, the second recognition unit 217 determines whether the difference between the acquired ratio and the ratio acquired in the previous output is equal to or greater than a threshold. If the difference is equal to or greater than the threshold (YES in step S604), then in step S605, the second recognition unit 217 outputs the ratio acquired in step S603 to the display control unit 218 as the scaling ratio of the display image indicated by a multi-touch operation.

In step S606, the second recognition unit 217 determines whether the current frame is the first frame for starting the second recognition process. If the current frame is the first frame (YES in step S606), then in step S607, the second recognition unit 217 holds, in the RAM 202, the information indicating "the direction of the hand" extracted in step S303, as information of a reference direction. If the current frame is not the first frame (NO in step S606), then in step S608, the second recognition unit 217 acquires the angular difference between the reference direction and "the direction of the hand" acquired from the current frame. Then, in step S609, the second recognition unit 217 determines whether the difference between the acquired angular difference and the angular difference acquired in the previous output is equal to or greater than a threshold. If the difference is equal to or greater than the threshold (YES in step S609), then in step S610, the second recognition unit 217 outputs the angular difference acquired in step S608 to the display control unit 218 as the angle of rotation of the display image indicated by a multi-touch operation.

The threshold determinations in steps S604 and S609 are made, whereby it is possible to prevent output of the unnecessary results of recognizing a scaling operation and a rotation operation due to a minute change in the orientation of the hand region. If once set, the reference size and the reference direction are not changed until the selected state of the second recognition process is canceled. In the present exemplary embodiment, when the selection is canceled based on the process of step S316, the information of the reference distance and the reference direction is deleted from the RAM 202. Further, if the information processing apparatus 100 does not recognize a scaling operation, the processes of steps S601 to S605, which correspond to a scaling operation, can be omitted. Similarly, if the information processing apparatus 100 does not recognize a rotation operation, the processes of steps S606 to S610, which correspond to a rotation operation, can be omitted.

[Selection and Cancellation of Recognition Process]

A description is given here of the operations and the effects of the processes of steps S305 to S314, in which a multi-touch operation recognition process is selected and canceled based on the number of the detected indicated positions in the touch state, in the present exemplary embodiment.

The first recognition process is a processing method for recognizing a touch operation based on the coordinates of a plurality of indicated positions in a touch state. In the first recognition process, changes in the input position coordinates are reflected on the scaling ratio and the angle of rotation. Thus, the first recognition process is considered to be a more intuitive recognition technique for the operator accustomed to a touch operation than the second recognition process. Therefore, in the present exemplary embodiment, if two indicated positions in a touch state can be detected, the first recognition process is executed wherever possible. Thus, if the number of detected indicated positions is two, then in step S308, the selection unit 215 selects the first recognition process to be performed by the first recognition unit 216.

In the present exemplary embodiment, while a multi-touch operation based on a change in the positional relationship between two indicated positions is being recognized by the first recognition process, and if the number of the detected touch positions shifts from two to one, then in step S311, the selection unit 215 selects the second recognition process, thereby switching recognition methods. Such a shift of the number of the detected touch positions occurs in the case where one of the fingertips in the multi-touch operation enters the blind spot of the range image sensor 102. In many cases, however, the operator themselves has not intended to switch operation methods, but has the perception that the operator is continuing the touch input without interruption. In the second recognition process after the switching, based on the features of the hand region that can be detected regardless of whether two indicated positions in a touch state are detected, it is possible to recognize the same operation as a predetermined multi-touch operation that can be recognized by the first recognition process. Thus, the first recognition process is switched to the second recognition process at the timing when the number of detected indicated positions in a touch state shifts from two to one, whereby it is possible to prevent a multi-touch operation that is being recognized from being interrupted against the operator's intention, and continuously output the recognition result.

In the present exemplary embodiment, while a multi-touch operation recognition is not being performed, and if the number of detected indicated positions shifts to one, that is, if the number of detected indicated positions shifts from zero to one, it is estimated that the operator is likely to have intentionally performed a single-touch operation using one fingertip. Thus, in this case, neither of the gesture recognition processing methods is selected, and the recognition of a multi-touch operation is not started (NO in step S310). For example, if a single-touch operation recognition process is executed after or in parallel to the flowchart in FIG. 3, it is determined whether the movement of one detected indicated position is an input to be recognized as a single-touch operation.

Further, in the present exemplary embodiment, also if the number of detected indicated positions in a touch state shifts to three or more, a multi-touch operation is recognized by the second recognition process (NO in step S309). The case where the number of detected indicated positions in a touch state is three or more is, for example, the case where the fingers of the hand are close to each other, and therefore, the fingertip of a finger that is not used for the multi-touch also comes close to the operation surface 101 across the touch threshold. In such a case, to recognize the multi-touch operation by the first recognition process, it is necessary to choose indicated positions used for input as intended by the operator. In the present exemplary embodiment, priority is given to continuing to recognize, without interruption, a multi-touch operation that is being input. Thus, the processing method is switched to the second recognition process, and the multi-touch operation is continuously recognized. As a matter of course, however, it is also possible to perform the process of choosing, from among the three or more indicated positions in the touch state, indicated positions used for the multi-touch operation and then continue to recognize the multi-touch operation by the first recognition process. Indicated positions are chosen by, for example, selecting the two indicated positions closest to the most recent coordinates of two indicated positions that have been recognized by the first recognition process immediately before the switching. Further, a method suitable for the state of the system may be selected, such as selecting from among the three or more indicated positions the two earliest indicated positions based on the detection times of the indicated positions.

Further, in the present exemplary embodiment, while a multi-touch operation is being recognized by either of the recognition processes, and if the number of detected indicated positions in a touch state shifts to zero, then in step S312, the determination unit 214 acquires the height of the hand. Then, in step S313, the determination unit 214 determines whether the hand is at a position sufficiently higher than the operation surface. In the present exemplary embodiment, if the hand is not at a position sufficiently higher than the operation surface, not even one indicated position is detected temporarily, for example, due to the fact that the fingertips are hidden in a blind spot, but there is a possibility that the touch input is being continued. Thus, the selected state of the already selected recognition process is maintained, and the multi-touch operation is recognized, if possible. If the first recognition process is selected, it is difficult to recognize a specific operation in the state where the number of detected indicated positions is zero. Thus, the determination unit 214 waits for an image to be acquired from the next frame, without providing a new output. If the hand moves to a position sufficiently higher than the operation surface (YES in step S313), then in step S314, the selection unit 215 considers that the multi-touch operation ends. Then, the selection unit 215 cancels the selection of the recognition process.

Based on the above, in the present exemplary embodiment, even if the detection of indicated positions in a touch state is failed, it is possible to continue recognizing a multi-touch operation. Further, a single-touch operation and the case of losing sight of one point during a multi-touch operation are distinguished from each other. Thus, it is possible to recognize both a single-touch operation and a multi-touch operation.

In the above example, an example has been described where in the process of acquiring the height of the hand in step S312, the height of the center of gravity of the hand region is acquired. Alternatively, instead of the height of the center of gravity, the height of a portion around the bases of the fingers may be used as a reference for the height of the hand. The user can input a touch operation in a unique orientation. Thus, to end a touch operation, some user may merely move their finger away from the operation surface without changing the height of the hand. In such a case, not the height of the center of gravity of the hand but a change in the height of a portion around the bases of the fingers is detected, whereby it is possible to more accurately determine whether the touch operation is being performed.

[Variation in which Correction Process is Performed]

When the two multi-touch operation recognition processing methods are switched, the output value of the recognition result may be discontinuous. Therefore, as a variation applicable to the present exemplary embodiment, a description is given of the process of making correction so that the output value is not discontinuous when the recognition processing methods are switched.

(1) Switching from First Recognition Process to Second Recognition Process

FIG. 7A illustrates, as an example of a multi-touch operation, the case where the output value (the scaling ratio) occurring when the scaling operation recognition methods are switched from the first recognition process to the second recognition process is discontinuous. In FIG. 7A, the distance between two points, "the size of the hand", the ratio to information acquired in the previous frame, and the scaling ratio to be output as a result, which are acquired from a time t0 to a time t5, are arranged in order from left to right. From the time t0 to the time t2, the first recognition process is executed. From the time t2 to the time t3, the processing methods are switched. From the time t3 to the time t5, the second recognition process is executed. In the example of FIG. 7A, when the processing methods are switched from the time t2 to the time t3, the output value changes from 120% to 100%, and a discontinuity occurs.

Correction Process 1

In a correction process 1, in step S315 in the flowchart in FIG. 3, every time the latest output value of the first recognition process is output, information of the latest output value is held as a final output value. Then, if the second recognition process is selected in step S311, then in step S315, a value obtained by correcting, using the final output value, the value of the result of the second recognition process is output. FIG. 8A illustrates an example of the result of recognizing a scaling operation in the case where the correction process 1 is performed. In the example of FIG. 8A, a ratio of 120%, which is obtained by the first recognition process immediately before the recognition processes are switched (the time t2), is held as a final ratio. In the second recognition process after the switching, a value obtained by multiplying, by the final ratio of 120%, a ratio obtained by the second recognition process is output. Consequently, even when the recognition processes are switched from the time t2 to the time t3, the output value is 120%, and a discontinuity does not occur. In the case of a rotation operation, a value obtained by adding the final output value to the output value of the second recognition process is output, whereby it is possible to prevent a discontinuity.

Correction Process 2

Also in a correction process 2, during the first recognition process, the latest output value is held as a final output value. Further, during the first recognition process, the value of a feature (a hand feature) regarding the state of the hand obtained in the process of step S303 based on the latest frame is held as a final hand feature. Then, if the second recognition process is selected in step S311, then in step S315, an output value is calculated using as a reference not a hand feature acquired from the latest frame but the final hand feature held by the first recognition process based on the previous frame. After the switching to the second recognition process, a value obtained by correcting, using the final output value, an output value acquired using the final hand feature as a reference is output.

FIG. 8B illustrates an example of the result of recognizing a scaling operation in the case where the correction process 2 is performed. In the example of FIG. 8B, a ratio of 120%, which is obtained by the first recognition process immediately before the recognition processes are switched (the time t2), is held as a final ratio. Further, a value of 160 mm, which is extracted as "the size of the hand", is held as a final "size of the hand" in a final hand feature. In the second recognition process after the switching, a ratio is calculated using 160 mm, which is the final "size of the hand", as a reference size. Further, a value obtained by multiplying the calculated ratio by the final ratio of 120% is output. Consequently, when the recognition processes are switched from the time t2 to the time t3, the output value changes from 120% to 128%, and it is possible to continuously recognize an enlargement operation.

(2) Switching from Second Recognition Process to First Recognition Process

FIG. 7B illustrates, as an example of a multi-touch operation, the case where the output value (the scaling ratio) occurring when the scaling operation recognition processing methods are switched from the second recognition process to the first recognition process is discontinuous. In the case of FIG. 7B, from the time t0 to the time t2, the second recognition process is executed. From the time t2 to the time t3, the recognition processes are switched. From the time t3 to the time t5, the first recognition process is executed. In the example of FIG. 7B, when the processing methods are switched from the time t2 to the time t3, the output value changes from 114% to 100%, and a discontinuity occurs.

Correction Process 3

Figure 9:
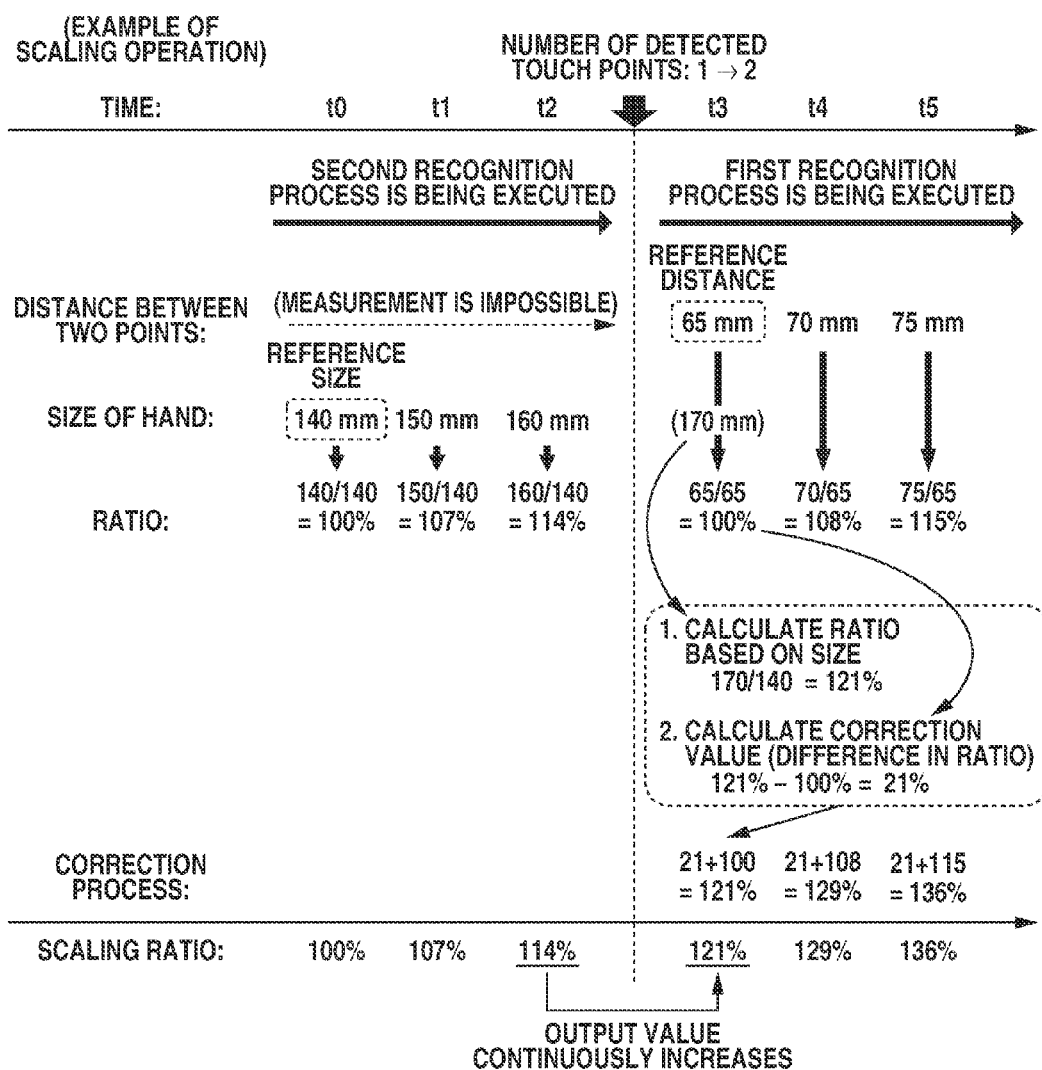
FIG. 9 is a diagram illustrating an example of a correction process when the second recognition process is switched to the first recognition process.

In a correction process 3, if the first recognition process is selected in step S308, and the process of step S315 is started, then in the frame for starting the first recognition process, the second recognition process by the second recognition unit 217 is executed in parallel with the first recognition process and a ratio is calculated. Then, the difference between the calculated ratio and the ratio obtained based on the first recognition process by the first recognition unit 216 is calculated and set as a correction value. In the first recognition process after that, a value obtained by correcting, using the correction value, an output value obtained as a result of the first recognition process is output. FIG. 9 illustrates an example of the result of recognizing a scaling operation in the case where the correction process 3 is performed. In the example of FIG. 9, a ratio of 121% is calculated from 170 mm, which is "the size of the hand" immediately after the recognition processes are switched (the time t3), and 140 mm, which is a reference size. A difference of 21% between the ratio of 121% and a ratio of 100%, which is acquired by the first recognition process, is set as a correction value. In the first recognition process after that, a value obtained by adding the correction value of 21% to the ratio to a reference distance of 65 mm is output. Consequently, when the recognition processes are switched from the time t2 to the time t3, the output value changes from 114% to 121%, and it is possible to achieve a continuous change in the output value. In the correction process 3, a correction value is taken into account not by multiplication but by addition. This is because there is no proportional relationship between the amount of change in the diameter of the circumcircle of the hand and the amount of change in the distance between two fingertips, and the range of change in the distance between two fingertips is greater. Thus, if multiplication is used, the output value may be excessively large.

As described above, according to the first exemplary embodiment and the variation of the first exemplary embodiment, if the operator inputs a multi-touch operation using two fingers of one hand, and even if it is difficult to detect an indicated position in consequence of the fact that one of the fingertips is hidden in the blind spot of an image acquisition method, it is possible to continuously recognize the operation that is being input. In the above exemplary embodiment, a predetermined operation recognized by the information processing apparatus is described as a multi-touch operation. Alternatively, the present invention is also applicable to the case where a similar operation involving the movement of the hand is input with some distance between the hand and the operation surface.

Next, as a second exemplary embodiment, a description is given of an example of the process of recognizing a spatial gesture operation input by an operator who uses both hands to issue an instruction to enlarge or reduce or to rotate an item projected and displayed on a wall surface screen. A spatial gesture operation refers to an operation method for providing an input by moving an operation object in the air, whereas a touch operation is performed under the condition that an operation object is brought into contact with or close to an operation surface. In the present exemplary embodiment, particularly, a recognition target is a spatial gesture operation for, while simultaneously indicating a plurality of places using a plurality of independent operation objects, moving the indicated plurality of places according to a predetermined rule, whereby an instruction command associated with the movements is input. As operation objects, both hands (portions beyond the wrists) of the operator are used. Particularly, a hand "making a fist" by bending all the fingers to the palm side is traced as an operation object that is inputting an operation.

In the second exemplary embodiment, if positions indicated by the ends of both hands of the operator inputting a spatial gesture are detected in the image capture range of an image acquisition method, a spatial gesture operation is recognized based on the movements of these two indicated positions (a first recognition process). Meanwhile, if either one of the indicated position is detected because one of the ends of both hands of the operator is hidden in a blind spot, a spatial gesture operation is recognized based on a change in the state of the upper body, using the features of a human body that can be acquired regardless of whether indicated positions are detected (a second recognition process).

In the second exemplary embodiment, the reason why the recognition of a spatial gesture operation is limited to the state where the hand of the operator is "making a fist" is to facilitate the specifying of the timing of the start of the operation and the timing of the end of the operation. This limitation is equivalent to the limitation of the recognition of a touch operation to the case where the distance between the fingertip of the operator and the operation surface is smaller than the touch threshold (a touch state) in the first exemplary embodiment.

[External Appearance of System]

FIG. 10A illustrates an example of the external appearance of an interface system according to the present exemplary embodiment. The hardware configuration of an information processing apparatus 100 according to the second exemplary embodiment applies correspondingly to the first exemplary embodiment, and is not described in detail here. In the system according to the second exemplary embodiment, a projector 104, which is installed such that a screen 1000 is a projection surface, projects an item 105 as an operation target on the screen 1000. Further, a range image sensor 102 is installed to capture an image of the space where the screen 1000 is a background. This space includes the screen 1000, the projected operation target item 105, and an operator 1001. If the screen 1000 is a display-integrated screen having the function of displaying the item 105, the configuration of the projector 104 can also be omitted.

[Functional Configuration of Apparatus]

FIG. 10B is a block diagram illustrating an example of the functional configuration of the information processing apparatus 100 according to the present exemplary embodiment. Each function unit is achieved by the CPU 200 loading a program stored in the ROM 201 into the RAM 202 and executing processing according to each flowchart that applies correspondingly to the first exemplary embodiment. However, hardware can also be used as an alternative.

In the first exemplary embodiment, in the first recognition process, an operation is recognized using indicated positions input using fingertips. In the second recognition process, an operation is recognized using the features of a hand region. In contrast, in the second exemplary embodiment, in the first recognition process, an operation is recognized using an indicated position (the center of the circumcircle) input by a hand making a fist. In the second recognition process, an operation is recognized using the features of a human body region is performed. Although information treated as a processing target as described above by each function unit illustrated in the block diagram in FIG. 10B is different, the functions themselves of the function units correspond to those of the function units of the information processing apparatus 100 according to the first exemplary embodiment illustrated in FIG. 2B. Thus, in FIG. 10B, the function units having functions equivalent to those in the first exemplary embodiment are designated by the same numbers and are not described in detail here.

A human body region extraction unit 1010 performs a threshold determination and a noise reduction process on each pixel in a range image input from the image acquisition unit 210 and extracts, from the range image, a region where a human body appears (a human body region). Thus, the feature extraction unit 213 extracts the features of the human body region extracted by the human body region extraction unit 1010. The details will be described later. A detection unit 1011 in the second exemplary embodiment specifies, in the human body region, a hand portion making a first and specifies the coordinate values of the center of the circumcircle of the hand portion as an indicated position. In the present exemplary embodiment, the feature extraction unit 213 estimates the position of each joint from the human body region to extract the skeleton. Then, the feature extraction unit 213 detects, from the extracted skeleton, a position corresponding to the end of the hand (the first) as the position of the end of the hand. The position estimation of each joint is performed by identifying, by random decision forest (RDF), to which part of the human body each pixel belongs, and clustering the identification results. Similarly to the recognition of multi-touch operations corresponding to a scaling operation and a rotation operation in the first exemplary embodiment, the first recognition unit 216 and the second recognition unit 217 recognize spatial gesture operations corresponding to a scaling operation and a rotation operation. In the second exemplary embodiment, however, an indicated position where a scaling operation or a rotation operation is input does not need to be in a touch state with the operation surface. Further, the predetermined operation that can be recognized as a scaling operation in the present exemplary embodiment is not limited to enlargement or reduction with the image aspect ratio fixed, but includes all instructions to change a length regarding the displayed image. Further, the predetermined operation that can be recognized as a rotation operation is not limited to rotation with the center of rotation fixed, but includes all instructions to change a direction regarding the displayed image.

[Spatial Gesture Operation Recognition Process]

With reference to a flowchart in FIG. 11, an operation recognition process according to the second exemplary embodiment is described. In the steps designated by the same numbers as those in the flowchart in FIG. 3, processes equivalent to those in the first exemplary embodiment are executed, and therefore, these steps are not described here, and the differences from the first exemplary embodiment are mainly described. The processing of the flowchart in FIG. 11 is achieved by the CPU 200, which configures each function unit of the information processing apparatus 100, loading a program recorded in the ROM 201 into the RAM 202 and executing the program. Further, this processing is started based on the case in which a range image captured by the range image sensor 102 is input to the information processing apparatus 100.

In step S301, the image acquisition unit 210 acquires, from the range image sensor 102, a range image obtained by capturing space including the wall surface screen 1000 and at least an upper body portion of the operator. In step S1101, the image acquisition unit 210 scans each pixel in the range image, thereby extracting a human body region of the operator in the range image. In the present exemplary embodiment, similarly to the first exemplary embodiment, a background subtraction method is used.

In step S1102, based on the orientation of the human body region extracted in step S1101, the human body region extraction unit 1010 extracts the features of the human body region. In the present exemplary embodiment, the human body region extraction unit 1010 extracts the size of the appearance of the upper body of the human body as a feature for recognizing a scaling operation and extracts the direction of the upper body of the human body as a feature for recognizing a rotation operation. In step S1103, the detection unit 1011 detects hand portions (portions beyond the wrists) in the human body region.

In step S1104, the detection unit 1011 determines whether there are hands making a first in the hands detected in step S1103. If there are hands making a first (YES in step S1104), the processing proceeds to step S1105. In step S1105, using the determination unit 214, the detection unit 1011 specifies positions indicated by the hands making a first and the number of the indicated positions.

The processes of steps S307 to S311, in which the determination unit 214 determines the number of the indicated positions and the selection unit 215 selects a recognition processing method, apply correspondingly to the first exemplary embodiment and therefore are not described here. In the second exemplary embodiment, if a recognition processing method is selected in step S308 or S311, the processing proceeds to step S1106. In step S1106, the first recognition unit 216 or the second recognition unit 217 executes the selected recognition process. A specific example of the recognition of a spatial gesture based on the features of the human body region executed by the second recognition unit 217 will be described later. An output process in step S316 also applies correspondingly to the first exemplary embodiment.

If, on the other hand, it is determined in step S1104 that there are no hands making a first (NO in step S1104), the processing proceeds to step S1107. In step S1107, the determination unit 214 acquires the distance between the human body and the operation surface (the wall surface screen) based on the extracted human body region. In the present exemplary embodiment, the determination unit 214 obtains, as the distance between the human body and the screen, the average distance between both elbows estimated from the human body region and the screen. Then, in step S1108, the determination unit 214 determines whether the distance between the human body and the screen is equal to or greater than a threshold. If the distance is equal to or greater than the threshold (YES in step S1108), the processing proceeds to step S314. In step S314, the selection unit 215 cancels the selection of the recognition process. In the present exemplary embodiment, the selection unit 215 references information, which indicates the recognition process in the selected state and is held in the RAM 202, notifies the corresponding recognition unit of the cancellation of the selection, and deletes the information. If the distance between the human body and the screen is less than the threshold (NO in step S1108), the processing proceeds to step S1106. In the present exemplary embodiment, the above spatial gesture operation recognition process is repeatedly performed every time a range image is input from the range image sensor 102.

[Second Recognition Process]

A description is given here of the details of the recognition process executed in step S1106 in the case where the second recognition process is selected in step S311 in the second exemplary embodiment. In the second recognition process, as a complementary method for the case where two indicated positions cannot be detected, a predetermined spatial gesture operation is recognized based on a change in the state of the upper body indicated by the features of the upper body that can be extracted from the human body region regardless of whether indicated positions can be detected. Also in the second exemplary embodiment, it is possible to recognize each of indications provided by a pinch-out operation, a pinch-in operation, and a rotation operation that can be recognized by the first recognition process. In the second recognition process, it is possible to recognize these indications by a method different from that of the first recognition process.

Figure 12A:
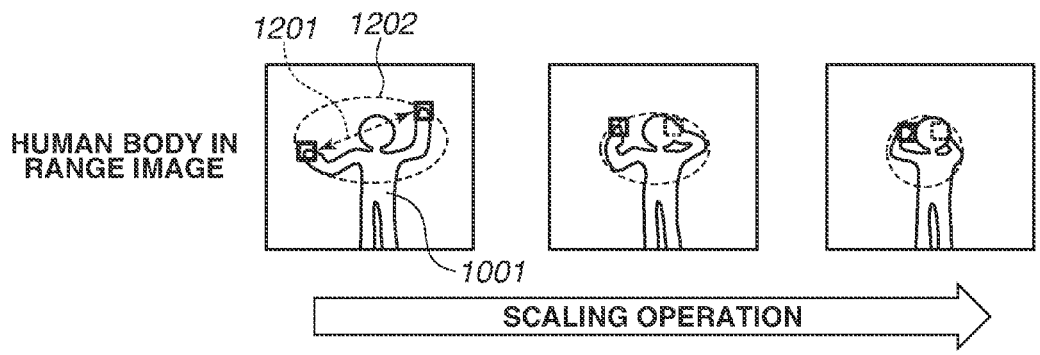
FIGS. 12A and 12B are diagrams illustrating states of a human body in spatial gesture operations.

In the case of the second exemplary embodiment, the second recognition unit 217 recognizes a spatial gesture operation based on a change in the state of the upper body indicated by the features extracted from the human body region. In the present exemplary embodiment, a scaling operation is recognized based on the size of the appearance of the upper body portion of the human body region (hereinafter, "the size of the upper body") as the feature of the human body region. FIG. 12A illustrates the state of the appearance of a human body in a range image during a scaling operation. FIG. 12A illustrates the state where the human body in a pinch-in operation as viewed along the negative direction of the z-axis, and illustrates the state where as a distance 1201 between touch positions in the scaling operation changes, a distance 1202 indicating "the size of the upper body" in the range image also changes. This is a change in a feature that can be detected even if either one of fists enters the blind spot of the sensor, and the indicated position cannot be detected. In response, in the second recognition process, if "the size of the upper body" of the human body region in the range image increases, the operation is recognized as a scaling operation indicating enlargement. If "the size of the upper body" of the human body region in the range image decreases, the operation is recognized as a scaling operation indicating reduction. Then, the scaling ratio according to the amount of change in the size is output. In the present exemplary embodiment, in step S1102, the human body region extraction unit 1010 calculates, as "the size of the upper body", the length of the line of apsides of an ellipse to which the upper body of the human body portion is approximated. Similarly to the detection of the hand, an upper body portion is estimated based on the extraction of the skeleton by the position estimation of each joint and the identification of a part by RDF. Alternatively, according to the installation position of the range image sensor 102, the width of the appearance of the human body or the area of the appearance of the human body can also be calculated as the size of the human body.

Figure 12B:
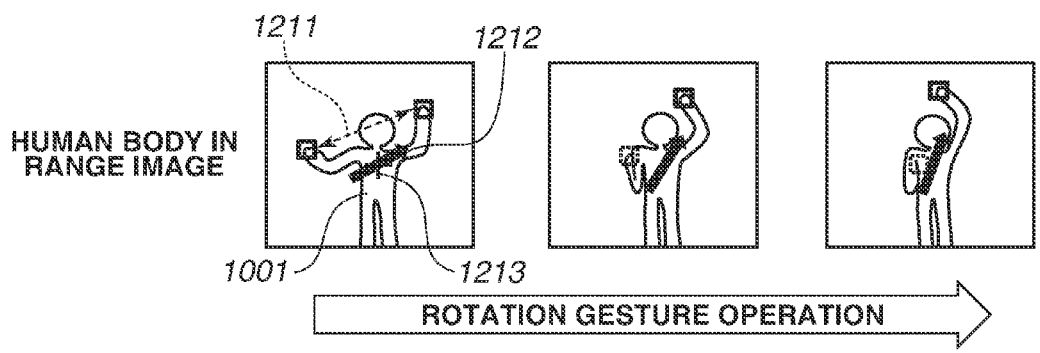

Further, in the present exemplary embodiment, a rotation operation is recognized based on the direction of the appearance of the upper body portion obtained from the human body region (hereinafter, "the direction of the upper body"). FIG. 12B illustrates the state of the appearance of the human body in a range image in a rotation operation. It is understood that as the direction of a vector 1211 connecting two indicated positions in the rotation operation changes, a vector 1212 indicating "the direction of the upper body" in the range image also changes. This is a change in a feature that can be detected even if either one of fists enters the blind spot of the sensor, and the indicated position cannot be detected. Therefore, in the second recognition process, a rotation operation is recognized according to a change in "the direction of the upper body" obtained from the range image, and the angle of rotation according to the amount of change in "the direction of the upper body" is output. In the present exemplary embodiment, in step S1102, the human body region extraction unit 1010 calculates, as "the direction of the upper body", the direction of the principal axis of inertia of the upper body portion having its center at a breast position 1213 of the human body region. Also in this case, similarly to the detection of the hand, the position of the breast is estimated based on the extraction of the skeleton by the position estimation of each joint and the identification of a part by RDF. Alternatively, according to the installation position of the range image sensor 102, the angle between the contour point of the upper body portion having the longest shortest distance from the breast position of the human body and the central position of the breast can also be calculated as the direction of the human body.

As described above, according to the second exemplary embodiment, if the operator inputs a spatial gesture operation using both hands, and even if it is difficult to detect an indicated position in consequence of the fact that one hand is hidden in the blind spot of an image acquisition method, it is possible to continuously recognize the operation that is being input. Also in the second exemplary embodiment, similarly to the first exemplary embodiment, it is possible to perform a correction process for preventing output from being discontinuous when the two recognition processes are switched.

In the above second exemplary embodiment, an indicated position for inputting a spatial gesture operation is defined as the position of a hand making a fist, thereby specifying the timing of the start of the operation and the timing of the end of the operation. However, also in a system using a wall surface screen as in the second exemplary embodiment, a multi-touch operation using both hands, which is input when the distance between the hand or the finger of the operator and the wall surface screen is smaller than a threshold, may be recognized. Similarly, also in the first exemplary embodiment, it is possible to specify the timing of the start of an operation and the timing of the end of the operation under a condition other than the condition that an indicated position is in a touch state, and then recognize a spatial gesture operation using fingers. For example, under the condition that one hand of the operator strikes a particular pose, it is also possible to recognize as an operation input an indicated position detected after that. In any system, the above exemplary embodiments are applied, whereby, even if it is difficult to detect at least one of a plurality of indicated positions forming an operation that is being input, in consequence of the fact that a part of an operation object is hidden in the blind spot of an image acquisition method, it is possible to continuously recognize the operation that is being input.

According to the present invention, even if it is difficult to detect at least one of a plurality of indicated positions forming an operation that is being input, in consequence of the fact that a part of an operation object is hidden in the blind spot of an image acquisition method, it becomes possible to continuously recognize the operation that is being input.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110215, filed May 29, 2015, which is hereby incorporated by reference herein in its entirety.

What is claimed is:

1. An information processing apparatus comprising:
a memory;
a processor that upon executing instructions stored in the memory functions as:
  a detection unit configured to detect, from an image obtained by capturing a predetermined object, one or more indicated positions indicated by a part of the predetermined object;
  an extraction unit configured to extract, from the image, feature information indicating a state of the predetermined object, the feature information being different from the one or more indicated positions;
  a first recognition unit configured to recognize, based on a change in a positional relationship between two or more of the indicated positions detected by the detection unit, an operation to be input to the information processing apparatus;
  a second recognition unit configured to, based on a change in the feature information extracted by the extraction unit, recognize the operation to be input to the information processing apparatus; and
  an output unit configured to output either one of recognition results of the first recognition unit and the second recognition unit, the either one of recognition results being selected based on a shift of a number of the indicated positions detected by the detection unit.

2. The information processing apparatus according to claim 1, wherein the feature information indicating the state of the predetermined object includes a feature indicating a size of a part of the predetermined object appearing in the image, or a direction of the predetermined object appearing in the image.

3. The information processing apparatus according to claim 1, wherein based on a case in which the number of the indicated positions detected by the detection unit shifts to two, the output unit outputs the recognition result of the first recognition unit.

4. The information processing apparatus according to claim 1, wherein based on a case in which the number of the indicated positions detected by the detection unit shifts from two to one, the output unit outputs the recognition result of the second recognition unit.

5. The information processing apparatus according to claim 1, wherein the output unit performs a process of providing an amount of change according to an amount of operation recognized by the first recognition unit or the second recognition unit, for an image displayed on a predetermined display device.

6. The information processing apparatus according to claim 1, wherein the operation to be input to the information processing apparatus includes an operation for inputting at least either of an instruction to change length information regarding an image displayed on a predetermined display device and an instruction to change direction information regarding the image displayed on the predetermined display device.

7. The information processing apparatus according to claim 1, wherein the operation to be input to the information processing apparatus includes a multi-touch operation for inputting at least either of an instruction to enlarge or reduce an image displayed on a predetermined display device and an instruction to rotate an image displayed by the predetermined display device.

8. The information processing apparatus according to claim 7, wherein in a case where the number of the indicated positions detected by the detection unit shifts to one, the second recognition unit continuously recognizes a same multi-touch operation as a multi-touch operation that has been recognized by the first recognition unit before the shift.

9. The information processing apparatus according to claim 1, wherein the operation to be input to the information processing apparatus includes a multi-touch operation for issuing an instruction of a reduction operation in which an image displayed on a predetermined display device is reduced, the first recognition unit recognizes the reduction operation according to a space between two indicated positions, and in a case where the number of the indicated positions detected by the detection unit decreases while the first recognition unit is recognizing the reduction operation, the second recognition unit takes over and recognizes the reduction operation.

10. The information processing apparatus according to claim 1, wherein the image obtained by capturing the predetermined object is a range image captured by a range image sensor, and
  wherein the range image sensor is installed so that distance information regarding a distance along an axis corresponding to a distance between the predetermined object and an operation surface as a target of a touch input performed using the predetermined object is reflected on a pixel value of the range image.

11. The information processing apparatus according to claim 10, wherein according to a distance between the operation surface and the indicated position detected from the range image, the first recognition unit recognizes a touch state between the predetermined object and the operation surface, and according to a distance between a position of a center of gravity of the predetermined object detected from the range image and the operation surface, the second recognition unit recognizes a touch state between the predetermined object and the operation surface.

12. The information processing apparatus according to claim 10, wherein in a case where the number of the indicated positions detected by the detection unit shifts to zero, the output unit outputs the recognition result of the second recognition unit based on a case in which the distance, estimated based on the range image, between the predetermined object and the operation surface is smaller than a predetermined condition.

13. The information processing apparatus according to claim 1, wherein in a case where the number of the indicated positions detected by the detection unit shifts to three or more, the output unit outputs the recognition result of the second recognition unit.

14. The information processing apparatus according to claim 1, wherein based on a change in a distance between two of the indicated positions detected by the detection unit, the first recognition unit recognizes an operation indicating an instruction to enlarge or reduce an image displayed by the predetermined display device.

15. The information processing apparatus according to claim 14, wherein, in the image obtained by capturing the predetermined object, based on a region where an image of the predetermined object is captured, the extraction unit extracts a feature regarding a size of the predetermined object, and wherein based on the feature corresponding to the size of the predetermined object extracted by the extraction unit, the second recognition unit recognizes an operation indicating an instruction to enlarge or reduce the image displayed by the predetermined display device, according to a change in the size of the predetermined object.

16. The information processing apparatus according to claim 1, wherein based on relative rotation between two or more of the indicated positions detected by the detection unit, the first recognition unit recognizes an operation indicating an instruction to rotate an image displayed by the predetermined display device.

17. The information processing apparatus according to claim 1, wherein upon executing instructions stored in the memory, the processor further functions as a selection unit configured to select, based on the shift of the number of the indicated positions detected by the detection unit, either of the first recognition unit and the second recognition unit, wherein based on a case in which the first recognition unit or the second recognition unit is selected by the selection unit, the selected recognition unit executes recognition of an operation input using the predetermined object.

18. The information processing apparatus according to claim 1, wherein the predetermined object is one hand of an operator, wherein, in the image, the extraction unit extracts a feature of a hand region where the one hand is captured, and wherein the detection unit detects one or more fingertip positions in the hand region.

19. An information processing apparatus comprising:
a memory;
a processor that upon executing instructions stored in the memory functions as:
    a detection unit configured to detect, from an image obtained by capturing a hand of a user, one or more fingertip positions in the hand;
    an extraction unit configured to extract, from the image, feature information indicating a state of the hand different from the fingertip positions; and
    a recognition unit configured to recognize, in a case where a number of the fingertip positions detected by the detection unit is a predetermined number that is two or more, a predetermined operation to be input to the information processing apparatus, based on a change in a positional relationship between the predetermined number of the fingertip positions detected by the detection unit, and to continue, in a case where the number of the fingertip positions detected by the detection unit decreases from the predetermined number, recognizing the predetermined operation to be input from the information processing apparatus, based on the feature information extracted by the extraction unit.

20. An information processing method performed by an information processing apparatus, the information processing method comprising:
    detecting, from an image obtained by capturing a predetermined object, one or more indicated positions indicated by a part of the predetermined object;
    extracting, from the image, feature information indicating a state of the predetermined object, the feature information being different from the one or more indicated positions;
    recognizing, based on a change in a positional relationship between two or more of the indicated positions detected, an operation to be input to the information processing apparatus;
    recognizing the operation to be input to the information processing apparatus based on a change in the feature information extracted; and
    outputting either one of recognition results, the either one of recognition results being selected based on a shift of a number of the indicated positions detected.

* * * * *